United States Patent [19]
Merritt, III

[11] Patent Number: 6,155,035
[45] Date of Patent: Dec. 5, 2000

[54] MULTI-FUNCTIONAL LAWN MOWER APPARATUS FOR USE WITH AN AUXILIARY APPARATUS AND METHODS OF UTILIZING THE SAME

[76] Inventor: C. Waverly Merritt, III, 301 Nantucket Ct., Winterville, N.C. 28590

[21] Appl. No.: 08/794,264

[22] Filed: Jan. 31, 1997

Related U.S. Application Data

[60] Provisional application No. 60/017,517, May 10, 1996.

[51] Int. Cl.$^7$ ..................................................... A01D 34/03
[52] U.S. Cl. .............................. 56/16.9; 56/11.4; 56/11.5; 56/16.9; 56/DIG. 9; 241/100
[58] Field of Search ..................................... 56/11.4, 11.5, 56/11.7, 13.5, 16.4, 16.4 R, 16.9, 17.3, DIG. 6, DIG. 9; 241/100

[56] References Cited

U.S. PATENT DOCUMENTS

| | | | |
|---|---|---|---|
| 2,062,195 | 11/1936 | Smith | 74/11 |
| 2,689,620 | 9/1954 | Hainke | 180/19 |
| 2,707,858 | 5/1955 | Norton et al. | 56/11.5 |
| 3,004,438 | 10/1961 | Funk et al. | 74/15.63 |
| 3,668,845 | 6/1972 | Parker | 56/11.6 |
| 3,782,085 | 1/1974 | Parker et al. | 56/16.9 |
| 3,945,176 | 3/1976 | Vicendese et al. | 56/11.8 |
| 3,979,827 | 9/1976 | Anzur | 56/16.9 |
| 4,113,188 | 9/1978 | Belinkoff | 241/37.5 |
| 4,170,099 | 10/1979 | Owens | 56/16.9 |
| 4,200,240 | 4/1980 | Machuron | 241/37.5 |
| 4,230,200 | 10/1980 | Carolan | 180/272 |
| 4,244,140 | 1/1981 | Carolan | 56/10.5 |
| 4,413,467 | 11/1983 | Arizpe | 56/11.3 |
| 4,824,029 | 4/1989 | Stottmann et al. | 241/375 |
| 4,896,488 | 1/1990 | Duncan et al. | 56/13.7 |
| 4,942,725 | 7/1990 | Ruder, Sr. | 56/16.9 |
| 4,965,990 | 10/1990 | Slawson, Sr. et al. | 56/13.7 |
| 4,991,382 | 2/1991 | Scag | 56/11.4 |
| 5,037,033 | 8/1991 | Stottmann et al. | 241/37.5 |
| 5,138,824 | 8/1992 | Oshima et al. | 56/10.2 |
| 5,146,735 | 9/1992 | McDonner | 56/11.7 |

OTHER PUBLICATIONS

Advertisement; *What's New;* Add–on Trimmer, p. 19, Innovators Marketing Resources (Undated).

Advertisement; *The Multi–Purpose Earthquake Plus Has The Ability To Rototill, Snowblow, Pressure Wash, Sweep & Mow Heavy Grass & Brush* (Undated Material).

*Ryobi 705r 725r Parts Manual;* pp. 1–11 (Nov. 1995).

*Ryobi Operator's Manual Addendum;* pp. 1–6 (undated).

*Primary Examiner*—Thomas B. Will
*Assistant Examiner*—Arpad Fabian Kovacs
*Attorney, Agent, or Firm*—Mills Law Firm PLLC

[57] ABSTRACT

A rotary lawn mower adapted to separately power an auxiliary apparatus includes a platform, front and rear wheels attached to and supporting the platform, a cutting blade, an engine connected to the platform and a converter mechanism connected with the engine for separately transferring power from the engine to the cutting blade and to the auxiliary apparatus. The converter mechanism includes a frame connected to the engine and dual coupling device for coupling the engine with the cutting blade and for separately coupling the engine with the auxiliary apparatus. When the dual coupling device is in a first position, the engine shaft is coupled to drive the cutting blade for movement thereof and is not positioned for coupling with the auxiliary apparatus for movement thereof. When the dual coupling device is in a second position, the engine shaft is coupled with the auxiliary apparatus for movement thereof and is not positioned for coupling with the cutting blade for movement thereof.

39 Claims, 10 Drawing Sheets

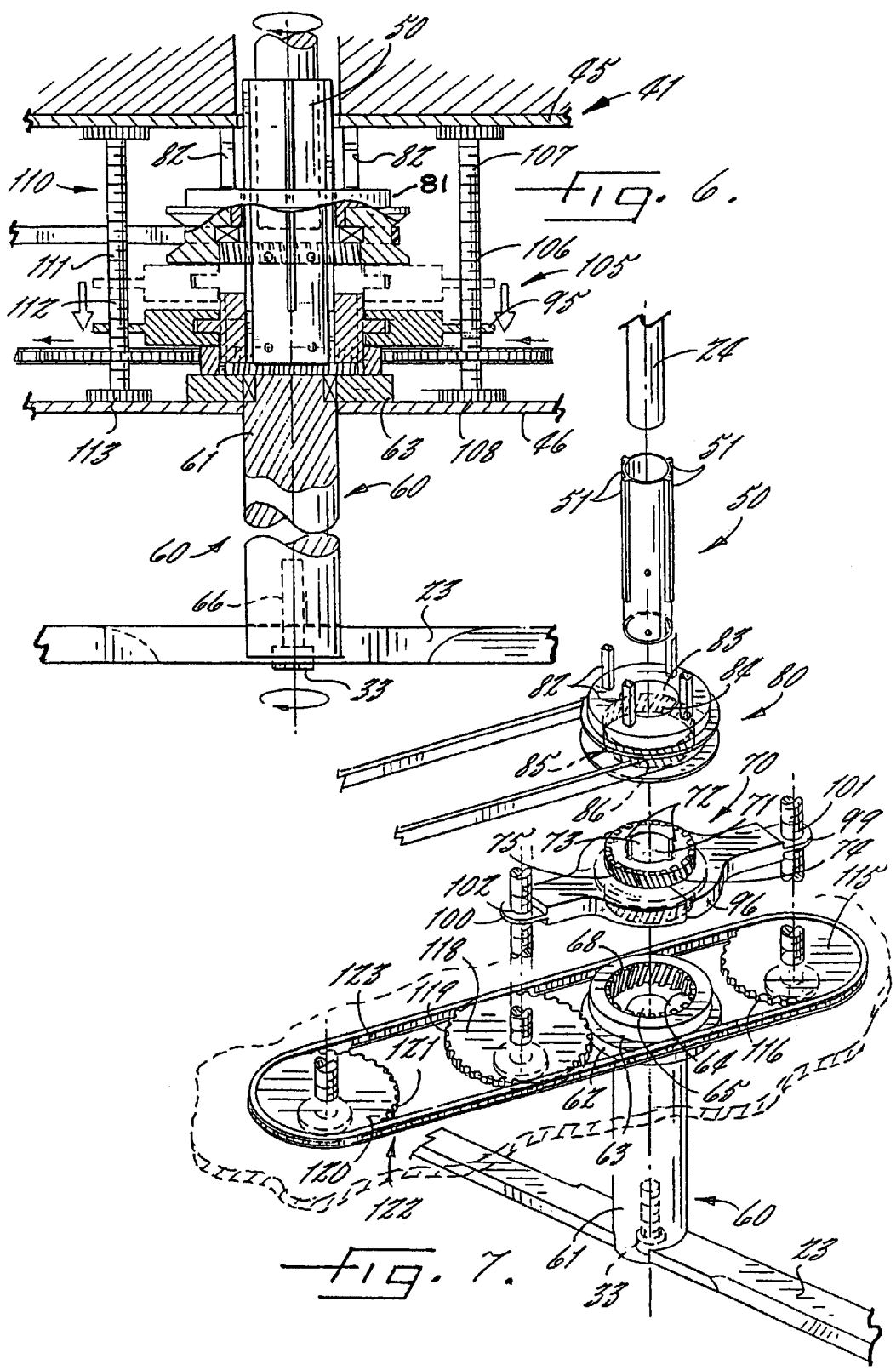

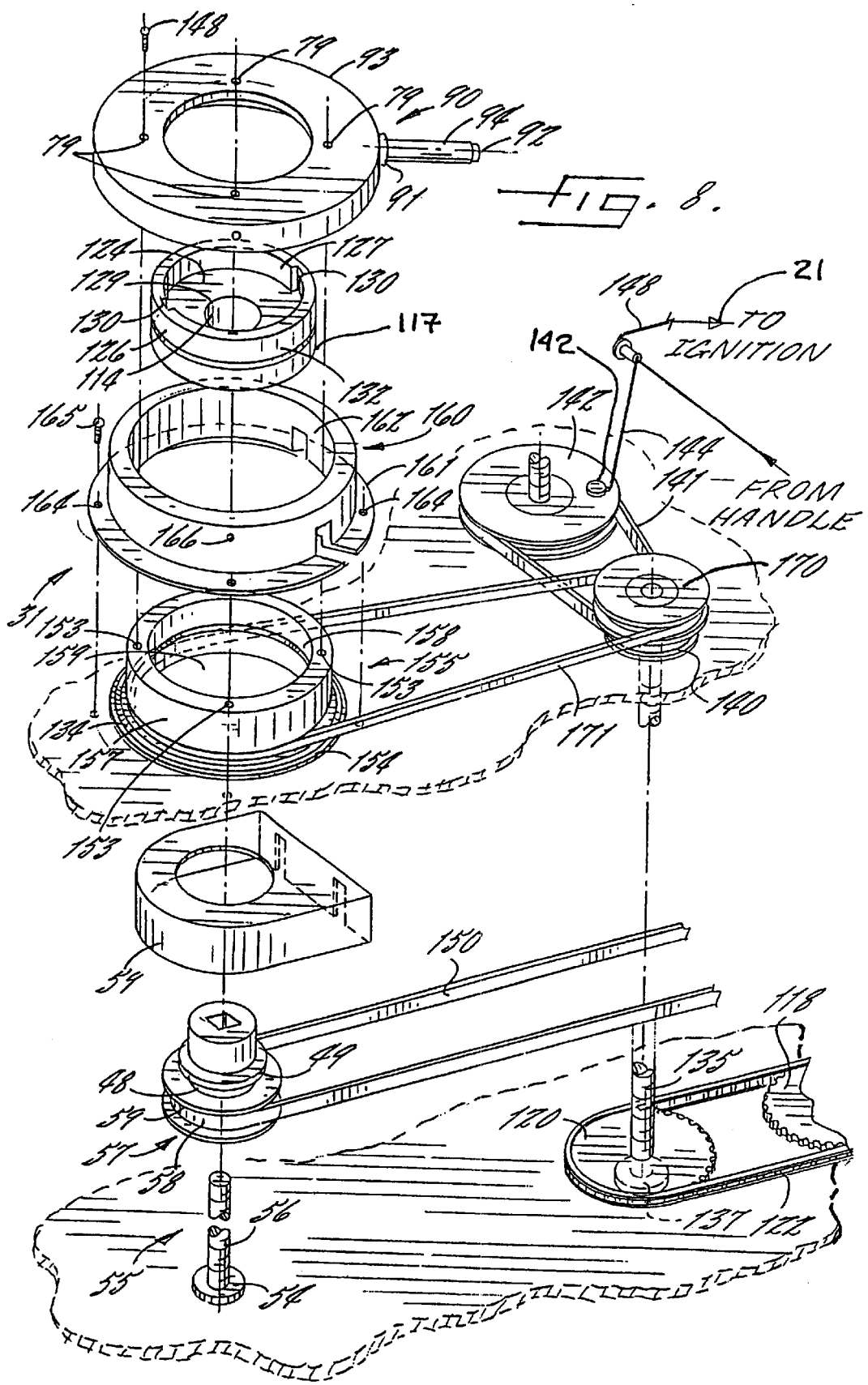

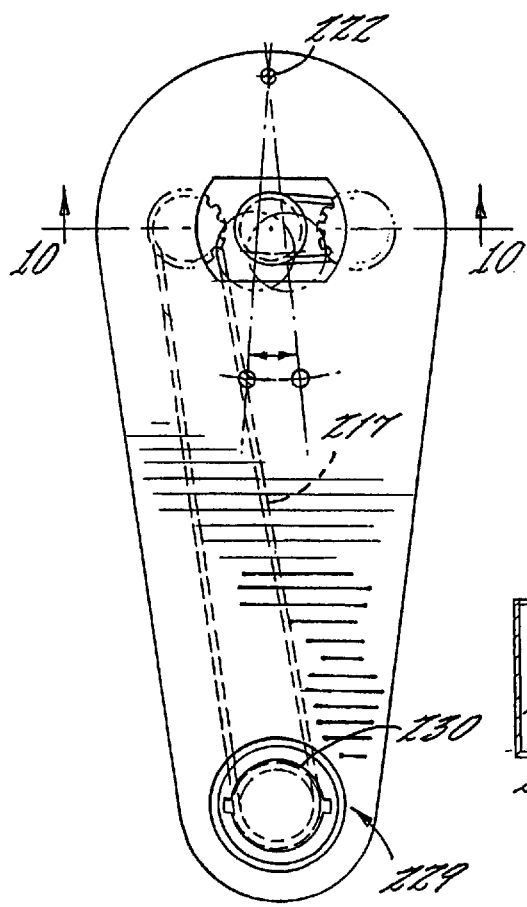
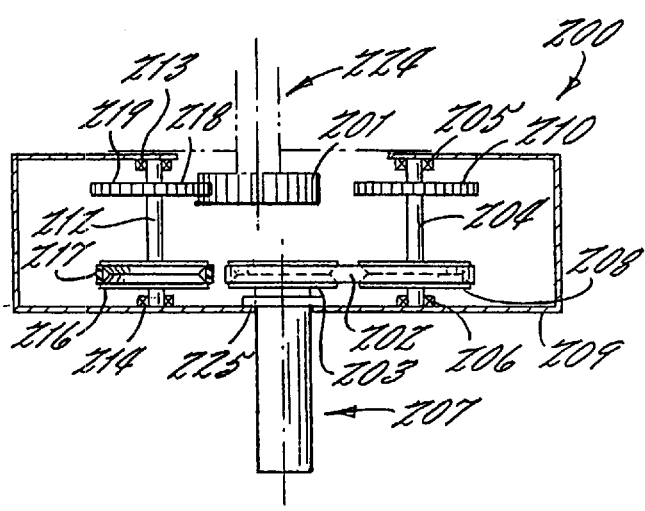
Fig. 9.
Fig. 10.

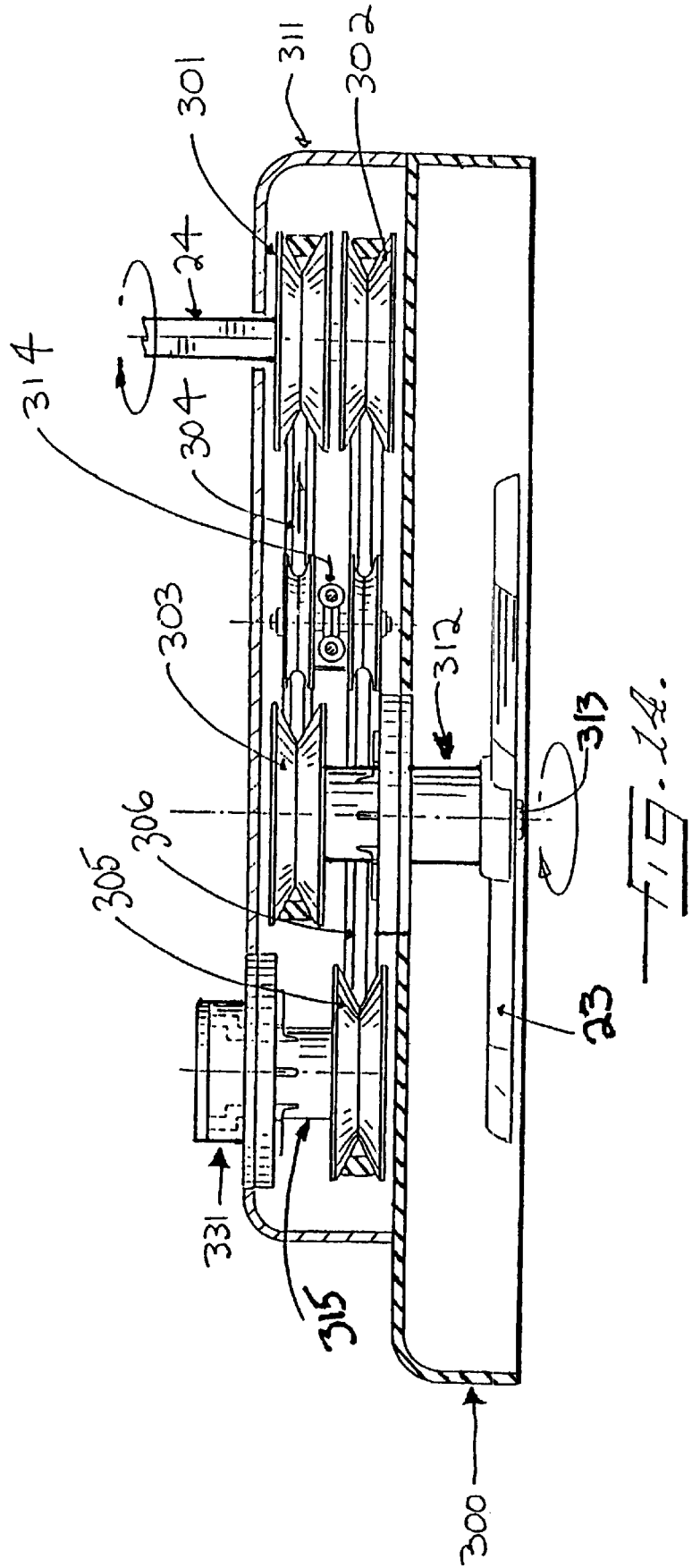

MULTI-FUNCTIONAL LAWN MOWER APPARATUS FOR USE WITH AN AUXILIARY APPARATUS AND METHODS OF UTILIZING THE SAME

RELATED APPLICATIONS

This application claims the benefit of U.S. Provisional Application Ser. No. 60/017,517, filed May 10, 1996.

FIELD OF THE INVENTION

The present invention is directed to lawn care and maintenance equipment generally and more specifically to lawn mowers.

BACKGROUND OF THE INVENTION

Lawn care and maintenance equipment of various types such as lawn mowers are used to perform various types of tasks. Generally, many of these devices include a self-contained power source such as an engine or motor powered by various fuels, electricity or batteries. These power sources add cost to each piece of equipment and necessitate the use of additional materials, labor and expense for construction, use and maintenance. For example, many of these engines require oil, other chemical lubricants and routine maintenance. Use of such materials also creates disposal and waste problems.

One type of such lawn care and maintenance equipment is self powered lawn mowers including riding mowers and walking mowers. Such mowers are generally equipped with a self-contained power source, typically rotary engines or motors with a cutting blade attached to a shaft of the engine. The engine shaft of these mowers rotates to drive the blade for cutting or mulching grass and other lawn coverings.

Previously, attempts have been made to power an auxiliary apparatus such as an edgier or trimmer by the central engine shaft of the lawn mower. Such power transfer mechanisms have powered the auxiliary apparatus directly from the existing engine shaft such that the engine blade and auxiliary apparatus are driven and spin in unison when the lawn mower engine is engaged. Generally, such apparatus have used pulleys or gears connected to the engine shaft to power the auxiliary apparatus. In these apparatus, the cutting blade generally remains connected to the original engine shaft. See, e.g., U.S. Pat. No. 4,170,099 to Owens. Some auxiliary lawn care apparatus have included mechanisms, such as levers, to engage or disengage the auxiliary lawn care apparatus with the engine shaft. These auxiliary apparatus have, however, been powered in unison with the engine blade which spins at all times when the engine is working. Further, these lawn care apparatus have generally been designed to be utilized with one apparatus such as an edgier attached to a conventional mower.

Cutting blades of such lawn mowers are generally designed to have sharp edges for cutting or mulching and to rotate at high speeds under great power. Such cutting blades can present dangerous hazards especially under conditions of operator misuse. A lawn mower which has its blade spinning and an auxiliary apparatus, such as an edgier, attached can create safety hazards with both the cutting blade and attached apparatus running simultaneously. For example, an operator may inadvertently place an object or a body part in proximity with the rotating cutting blade while utilizing an attached auxiliary apparatus. Further, the cutting blade can contact an object, such as a rock, in its path of rotation and damage the equipment or create a projectile hazard. In addition, operating the cutting blade can drain on power of the engine, thereby making less power available for the auxiliary apparatus.

Therefore, the multi-functional lawn mower apparatus according to the present invention can be provided utilizing the converter mechanism and methods described herein by both retrofitting a conventional single function lawn mower and in the design of a new lawn mower.

SUMMARY OF THE INVENTION

In view of the foregoing, it is an object of the invention to provide a multi-functional lawn mower apparatus having a converter mechanism which can separately engage and power, by a single power source, a cutting blade and a variety of auxiliary apparatus including lawn care and maintenance equipment.

It is still another object of the invention to provide a multi-functional lawn mower apparatus having a first safety mechanism connected with the engine and the lawn mower cutting blade and a second safety mechanism connected with the engine and the auxiliary apparatus such that neither the lawn mower cutting blade nor the auxiliary apparatus can be utilized without engaging the respective safety mechanisms.

It is also an object of the invention to provide such a converter mechanism which separately engages an engine to a cutting blade and to an auxiliary apparatus.

It is a still further object to provide a converter mechanism which separately engages an engine to a cutting blade and to a variety of auxiliary apparatus, each separately connectable with the converter mechanism.

These and other objects are satisfied by the present invention which provides a multi-functional lawn mower apparatus in which a single power source separately powers a cutting blade and a variety of auxiliary lawn care or maintenance apparatus. The lawn mower apparatus includes a converter mechanism which attaches to the lawn mower to separately couple the engine to the cutting blade and to an auxiliary apparatus attached to the lawn mower apparatus. The multi-functional lawn mower includes a platform, front and rear wheels attached to and supporting the platform, a cutting blade, an engine connected to the platform and a converter mechanism connected with the engine for separately transferring power from the engine to the cutting blade and from the engine to the auxiliary apparatus. The engine includes an engine shaft for supplying power to the cutting blade and the auxiliary apparatus. The engine shaft extends from the engine generally vertically below the platform. The converter mechanism includes a frame connected to the engine and dual coupling means for coupling the engine with the cutting blade and for separately coupling the engine with the auxiliary apparatus.

When the dual coupling means of the converter mechanism is in a first position, the engine shaft is coupled with one cutting blade to drive the cutting blade for movement thereof and the engine shaft is not positioned for coupling with the auxiliary apparatus for movement thereof. When the dual coupling means is in a second position, the engine shaft is coupled with the auxiliary apparatus for movement thereof and is not positioned for coupling with the cutting blade for movement thereof. Thus, a multi-functional lawn mower apparatus is provided which reduces cost, materials, and waste by utilizing a single power source to separately power a cutting blade and a variety of lawn care and maintenance equipment. The dual coupling means preferably separately couples the engine shaft with the cutting blade and with the auxiliary apparatus. The multi-functional lawn mower also facilitates the ease of utilization of various apparatuses, such as a water filled pressure-washer, use of which can replace environmentally harmful caustic chemicals.

In a preferred embodiment, the multi-functional lawn mower includes a safety mechanism connected with the engine and the dual coupling means. The safety mechanism is configured to move between a locked position and an unlocked position such that the engine is prevented from driving the auxiliary apparatus when the safety mechanism is in its locked position and the engine drives the auxiliary apparatus when the safety mechanism is in its unlocked position. Therefore, a multi-functional lawn mower is provided including a cutting blade and auxiliary apparatus which can be safely and separately utilized.

Also provided according to the present invention is a method for adapting a single function lawn mower to produce a multi-functional lawn mower apparatus. Having provided the lawn mower and converter mechanism as described, the cutting blade is removed from the engine shaft of the rotary lawn mower. The converter mechanism is then connected with the engine. Preferably, the engine is removed from the platform of the engine prior to connecting the converter mechanism. Also, it is preferred that the engine is connected with the converter mechanism and the platform after connecting the converter mechanism to the platform. An auxiliary apparatus as described herein can then be attached to the converter mechanism.

BRIEF DESCRIPTION OF THE DRAWINGS

FIG. 5 is a partial cutaway top view of the converter mechanism of the multi-functional lawn mower of FIG. 1.

FIG. 6 is a section view taken along line 6—6 of FIG. 5 showing the converter mechanism connected with the engine and cutting blade of the multi-functional lawn mower.

FIG. 7 is an enlarged exploded perspective view of a portion of the converter mechanism of FIG. 3 that resides directly below the engine shaft including a portion of an endless belt.

FIG. 8 is an enlarged exploded perspective view of a portion of the converter mechanism of FIG. 3 which attaches with an auxiliary apparatus and which includes a portion of the endless belt that connects with portions of the endless belt of FIG. 7.

FIG. 9 is a top view of an alternative embodiment of a multi-functional lawn mower having a converter mechanism according to the present invention showing an engine which separately couples with a cutting blade and an auxiliary apparatus.

FIG. 10 is a section view of the converter mechanism of the multi-functional lawn mower of FIG. 9 taken along lines 10—10 thereof.

FIG. 14 is a side view of the converter mechanism of FIG. 12.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
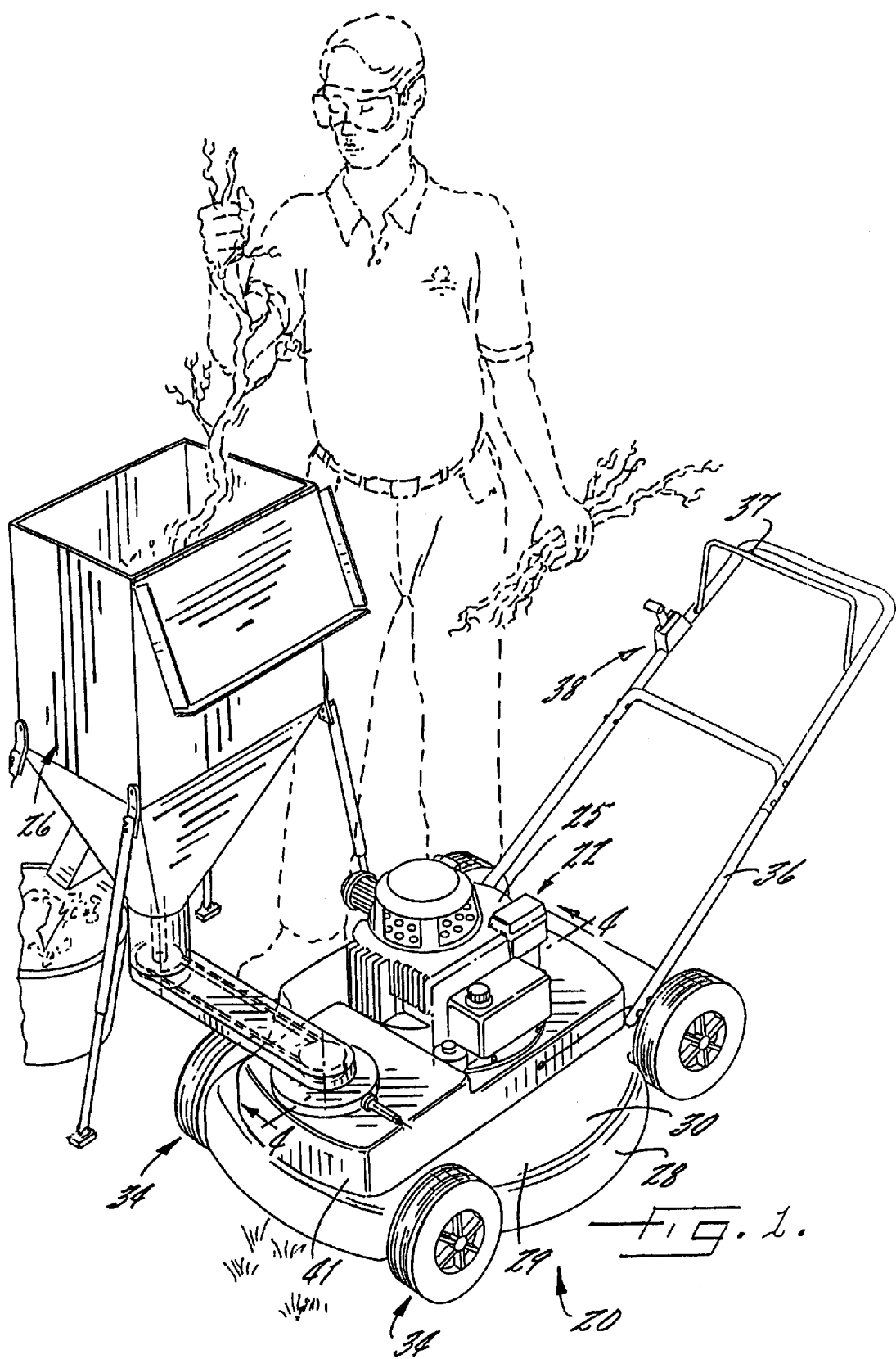
FIG. 1 is a perspective view of the multi-functional lower mower apparatus according to the present invention having a chipper-shredder attached.
Figure 2:
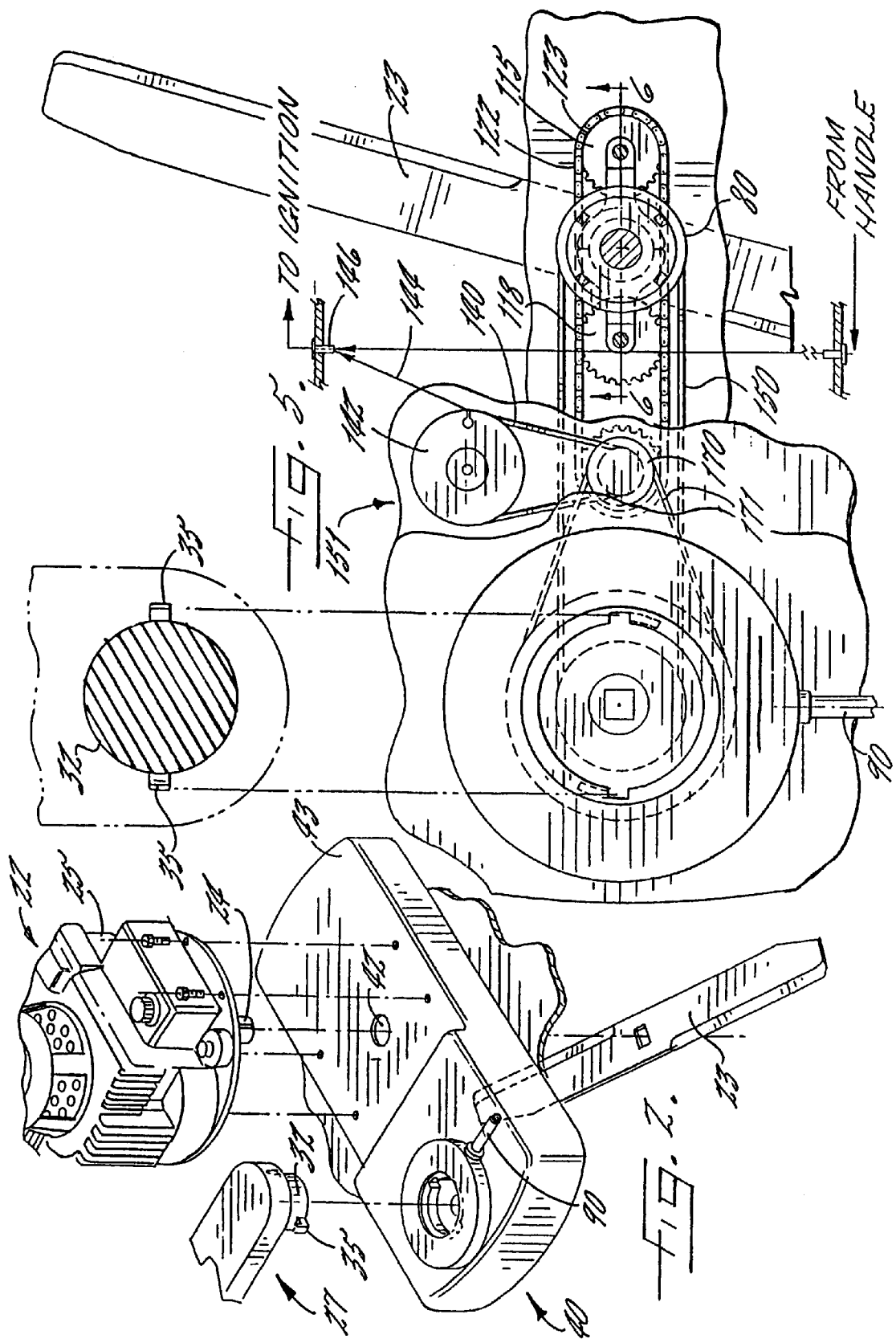
FIG. 2 is an enlarged, exploded perspective view of the multi-functional lawn mower and chipper-shredder of FIG. 1 showing a converter mechanism, engine and cutting blade.

Referring now to the figures, FIGS. 1 and 2 show a multi-functional, self-propelled, walking lawn mower 20 having a single power source or engine 22 configured to separately couple with a cutting blade 23 and an exemplary auxiliary apparatus illustrated herein as a chipper-shredder 26 via a converter mechanism 40. While a chipper-shredder 26 is described as the auxiliary apparatus throughout, it is understood that various other auxiliary apparatus can be used. The multi-functional lawn mower 20 includes a frame 28 having a platform 29 with an upper surface 30. Wheels 34 are rotatably connected to the frame 28 and support the frame 28 thereon. A handle 36 is connected to the frame 28 and includes a lever 37 connected to an engine safety mechanism. A control handle 38 for controlled movement of the propelling means is also shown. Such propelling means are known to one of ordinary skill in the art; therefore the details are not described herein. Alternatively, other types of lawn mowers, including riding mowers and manually-propelled walking mowers, can be employed with the present invention. The multi-functional lawn mower 20 can also be used with the cutting blade to cut or mulch grass or other lawn coverings or materials. An operator is illustrated in FIG. 1 feeding yard materials such as sticks and leaves into the chipper-shredder 26 attached to the multi-functional lawn mower 20.

In addition to the chipper-shredder 26, other types of auxiliary apparatus can be utilized with the multi-functional lawn mower. Suitable auxiliary apparatus include other lawn care and maintenance equipment such as snow blowers, air blowers, pressure washers, electricity generators, pumps, log splitters, edgers, wood chippers, power auger, compressors or power rakes and other equipment which can be adapted to be driven by a rotary engine or power source such as drills, tools, and vacuums. Suitable auxiliary apparatus could also preferably include devices powered by a 20 horsepower or less small engine. The chipper-shredder 26 is illustrated attached to the front portion of the platform 29 of the multi-functional lawn mower 20 (FIG. 1). The converter mechanism can be provided with the auxiliary apparatus in various other locations on the multi-functional lawn mower 20. For example, the chipper-shredder 26 is shown attached rearward of the engine 22 on an alternative embodiment of the multi-functional lawn mower apparatus 20' in FIG. 11.

The multi-functional lawn mower 20 also has a power source shown as a rotary gasoline powered combustion engine 22 connected on the frame 28 proximally above the platform 29 and with the converter mechanism 40. Other types of power source means can be utilized, including engines or motors powered by electricity or batteries as well as engines powered by fuels other than gasoline. As illustrated in FIGS. 1–4, the rotary engine 22 includes a body 25 and an engine shaft 24 which extends vertically from the bottom of the engine body 25. The engine 22 rotationally drives the engine shaft 24 to provide power to the cutting blade 23 and to the chipper-shredder 26. The converter mechanism 40 is connected to the upper surface 30 of the platform 29. The converter mechanism 40 includes a frame 41 connected with the platform 29 and the engine 22.

Figure 3:
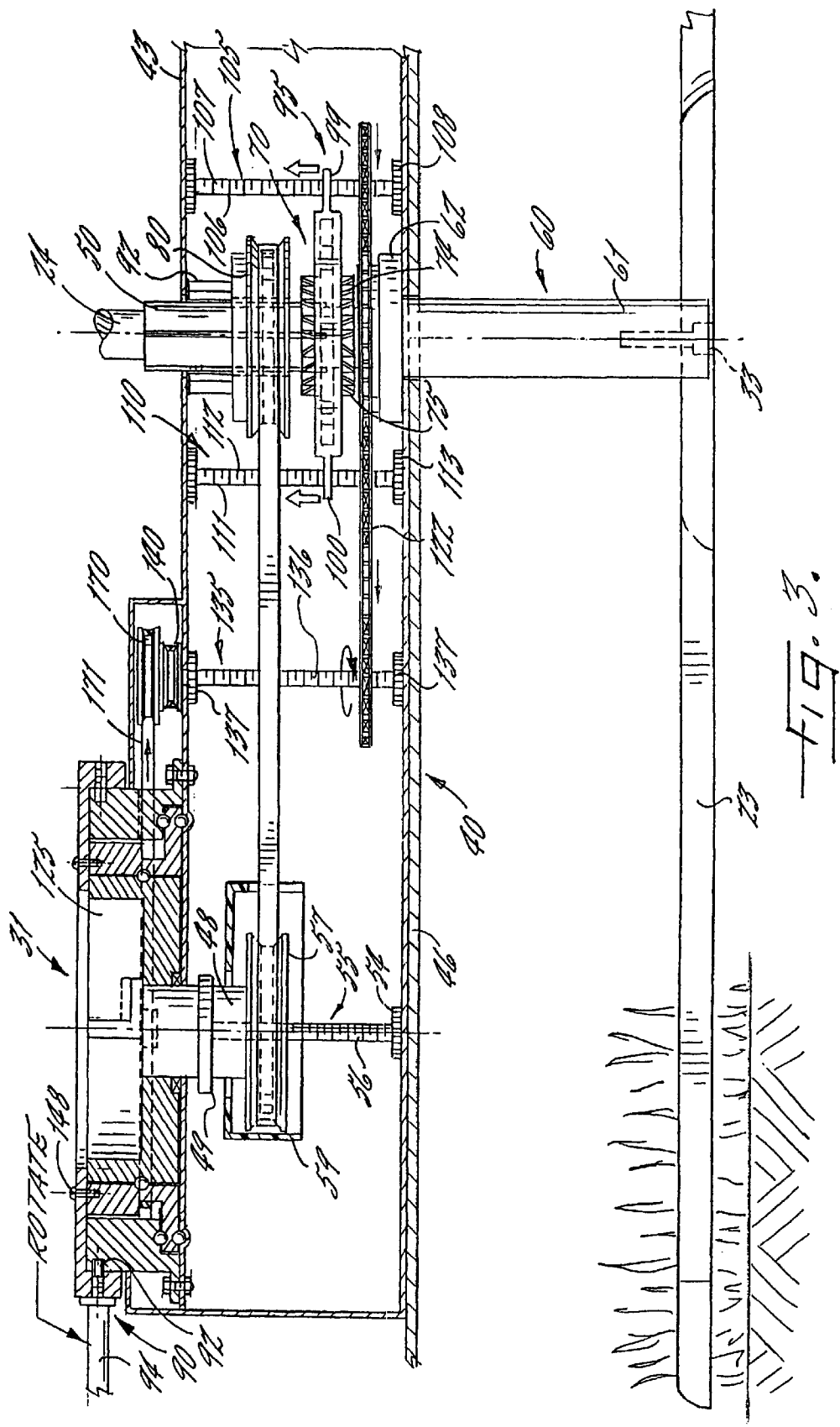
FIG. 3 is a section view of the converter mechanism of FIG. 1 with a cutting blade attached.
Figure 4:
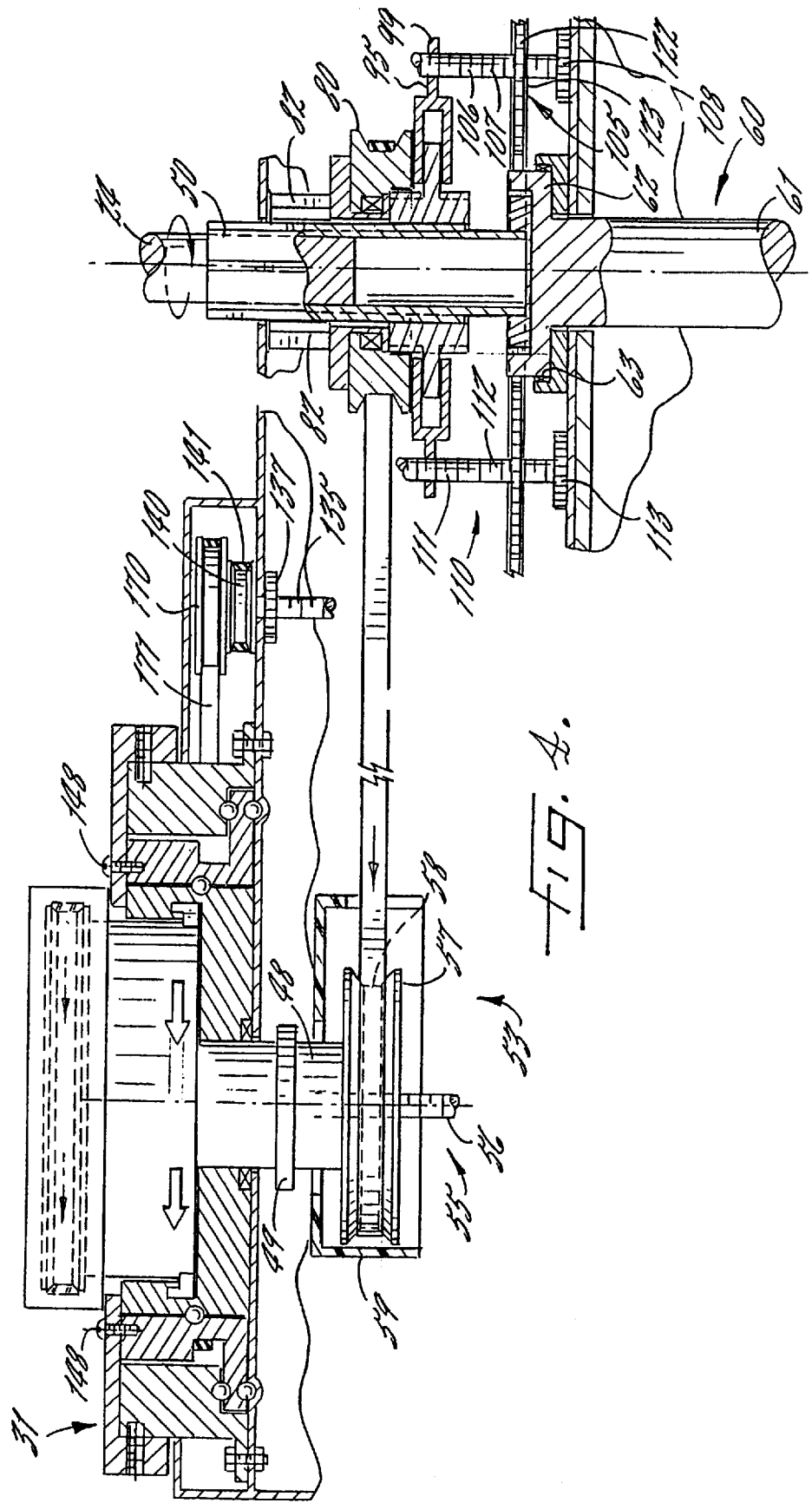
FIG. 4 is a section view of the converter mechanism of FIG. 1 taken along line 4—4 thereof coupling an engine with an auxiliary apparatus.

The engine shaft 24 extends downwardly into the interior of the converter mechanism 40 through an opening shown as a hole 42 in the top portion 43 of the converter mechanism frame 41 (FIGS. 2–4). The converter mechanism 40 is connected below the engine 22 and supports the engine 22. Alternatively, the converter mechanism 40 can be provided connected with the lawn mower platform 29, frame 28 and engine 22 in other positions or configurations. FIG. 3 shows a converter mechanism 40 of a multi-functional lawn mower 20 according to the present invention without an auxiliary apparatus connected to the convector mechanism 40.

The converter mechanism 40 enables the lawn mower engine 22 to separately engage and power the cutting blade 23 and an auxiliary apparatus such as a chipper-shredder 26 attached to the converter mechanism 40. In the embodiment shown in FIGS. 1–8, the converter mechanism 40 includes a frame 41, a sleeve 50 connected with the engine shaft 24, a blade sleeve 60 connected with the frame 41, an engaging gear 70 movable between first and second positions, an elevator arm 95, a plurality of threaded guides 105, 110, 135 and an auxiliary apparatus drive mechanism 53 including a coupling pulley 80, each of which is described in greater detail herein.

The sleeve 50 is inserted over the engine shaft 24 and rotatably connected with the engine shaft 24 with the same connecting means as the blade such as a nut and bolt or other suitable connecting means, including set screws inserted through the sleeve 50 into the engine shaft 24, press fitting and welding. The sleeve 50 and engine shaft 24 are also aligned to share a generally common longitudinal axis and extend generally vertically below the engine body 25 defining an elongated shaft portion. The sleeve 50 includes at least one key 51 (or preferably, a plurality of keys 51) extending longitudinally along a portion of the exterior surface of the sleeve 50. As shown in FIG. 7, the keys 51 extend along the sleeve 50 from the upper end portion to a medial portion. These keys 51 or other engaging means alternatively could be arranged in other configurations, such as tongue and groove, which can unite the motion of the sleeve 50 and the engine shaft 24. The sleeve 50 also has a ball spring not shown attached along a lower portion of the sleeve 50. The ball spring facilitates maintaining the sleeve 50 in relation to the shaft.

The engaging gear 70 is slideably connected with the sleeve 50 (FIGS. 3–4 and 6 and 7). The engaging gear 70 contains a cylindrical interior surface 73 defining a hollow inner portion 71 through which the sleeve 50 and engine shaft 24 are connected. The engaging gear 70 has key slots 72 extending longitudinally along a portion of the interior surface 73 which slideably and meshingly mate with the keys 51 on the sleeve 50. The engaging gear 70 also includes divots configured to receive the ball spring 52 mounted on the sleeve 50.

The engaging gear 70 is slideably mounted with the sleeve 50 such that the gear 70 can slideably move along the sleeve 50 between a first and second position (FIGS. 3–4 and 6 and 7). When this gear 50 moves from the first position to the second position, the key slots 72 of the gear 70 slide along the keys 51 of the sleeve 50. The engaging gear 70 is shown in the first position (FIG. 6), in transition between the first position and second position (FIG. 3) and in the second position (FIG. 4).

The engaging gear and sleeve can also be provided in alternative embodiments with other means of matingly engaging or coupling the gear and the sleeve such that the gear would be slidable or movable along a predetermined path defined by the sleeve.

As shown in FIGS. 3 and 7, the engaging gear 70 also includes gear teeth 74 or other engaging means on an exterior surface portion 75. These gear teeth 74 extend radially from the exterior surface 75 and extend longitudinally from the upper portion to the lower portion of the exterior surface 75. These gear teeth 74 can be provided in various configurations and sizes as known to one of ordinary skill in the art and need not be described herein.

The engaging gear 70 is also mounted on an elevator arm 95 (FIGS. 3–4 and 7) which has a hollow, generally circular body portion 96. The body portion 96 has an inner edge defining an opening generally configured to receive and connect with the engaging gear 70 in this opening. The elevator arm 95 also includes end portions 99, 100 positioned on opposite ends of the body portion 96. The opposite end portions 99, 100 include respectively, apertures 101, 102.

A first elevator guide 105 and second elevator guide 110, each having a respectively threaded guide 106, 111 with an elongated shaft 107, 112, are rotatably connected with the frame 41 (FIGS. 3–4 and 6–7). The elevator guides 105, 110 are connected with the upper portion 45 of the frame 41 and the lower portion 46 of the frame 41. The first threaded guides 106 and second threaded guide 111 are connected with the elevator arm 95 respectively through the first and second holes 101, 102. The first elevator guide 105 and the second elevator guide 110 each also preferably include a lower bearing 108, 113 connected at the lower portion of each threaded guide 106, 111. The first and second elevator guides 105, 110 are positioned on opposite sides of the engine shaft (FIGS. 4 and 5). The first and second threaded guides 106, 111 extend generally parallel to the shaft 24 and sleeve 50.

The elevator arm 95 travels between a first position and a second position along the first and second elevator guides 105, 110, thereby moving the engaging gear 70 between its first and second position. Other configurations of the elevator arm can alternatively be provided with connecting means for connecting to the elevator guides, for example, a ball and roller guide. Also, other means for moving the elevator arm can be provided such as other mechanical levers, handles, or electrical elevator devices or motors.

Referring still to FIGS. 3, 5 and 7, a first chain sprocket 115 is connected to the first elevator guide 105 and a second chain sprocket 118 is connected to the second elevator guide 110. The first and second chain sprockets 115, 118 are connected to lower portions of the first and second elevator guides respectively. However, these chain sprockets in other embodiments can be connected at different locations on the elevator guides.

The first chain sprocket 115 and second chain sprocket 118 both include teeth 116, 119 or other means for engaging a chain 122, including links 123 which is rotatably connected with the first chain sprocket 115 and second chain sprocket 118 (FIG. 6). The links 123 of the chain 122 meshingly engage with the teeth 116 of the first chain sprocket 115 and the teeth 119 of the second chain sprocket 118.

The chain 122 is connected with the first chain sprocket 115 and second chain sprocket 118 such that moving the first chain 122 rotates the first and second chain sprockets 115, 118 and first and second elevator guides 105, 110. Rotating the first and second elevator guides 105, 110 raises and lowers the elevator arm 95 between its first and second positions. Other engaging means, such as a lock and key, or can be provided to engage and rotate the elevator guides to move the elevator arm between the first and second position.

The converter mechanism 40 further comprises a coupling pulley 80 which is rotatably connected with the frame 41 (preferably with the top portion 43 of the convector mechanism 40) as is illustrated in FIGS. 3–4. A bearing 81 is connected with the coupling pulley 80 and with the frame 41 by posts 82. The coupling pulley 80 is rotatably connected to the bearing 81 such that the coupling pulley 80 rotates relative to the bearing 81 which remains stationary.

The coupling pulley 80 has a generally cylindrical interior wall 83 defining a hollow interior portion 84 and a gearing unit 85 connected within the hollow interior portion of the pulley 80. The gearing unit 85 includes teeth 86 or other engaging means configured to meshingly engage with the teeth 74 on the exterior surface 75 of the engaging gear 70 when the converter mechanism 40 is in its second position (FIG. 4), such that the engine 22 drives the coupling pulley 80 and is not positioned to couple with the cutting blade 23 and does not rotate the cutting blade 23. When the converter mechanism 40 is in its first position, the gearing unit 85 of the coupling pulley 80 does not engage with the engaging gear 70 (FIG. 3).

The converter mechanism 40 also includes a blade sleeve 60 (FIGS. 3 and 6). The blade sleeve 60 includes an elongated shaft 61 and a lip portion 62 in its upper end portion. A bearing 63 is connected to the upper portion of the blade sleeve 60. The bearing 63 defines a portion of the lip portion 62 of the blade sleeve 60. The blade sleeve 60 also has a cylindrical gearing unit 64 with teeth 68 and a cylindrical inner wall 65 defining a hollow interior portion of the lip portion 62 (FIG. 7).

The blade sleeve 60 is connected with the bearing 63 to the bottom portion 46 of the converter mechanism 41, as shown in FIGS. 4 and 6. The blade sleeve 60 also preferably contains a threaded slot 66 in its distal portion (FIG. 6). The threaded slot 66 extends generally coextensively within the interior of the blade sleeve 60 along the longitudinal axis of the blade sleeve 60. The threaded slot 66 includes threads or other means releasable connecting the blade sleeve 60 with the cutting blade 23 via a threaded screw 33 or other fastener. The blade sleeve 60 rotates in unison with the cutting blade 23 when coupled with the engine shaft (FIG. 6). When the converter mechanism 40 is in its first position, the teeth 74 of the engaging gear 70 meshingly engage the teeth 68 of the blade sleeve 60 (FIG. 6), thereby releasable coupling the engine 22 and cutting blade 23 such that the engine 22 drives the cutting blade 23 attached to the blade sleeve 60 and the engine shaft 24 is not coupled with the chipper-shredder 26 so that the chipper-shredder 26 does not rotate. When the converter mechanism 40 is in its second position, the engaging gear 70 does not engage the blade sleeve 60 and the engine 22 and thus is not releasable coupled with the cutting blade 23, such that the engine 22 does not rotate the cutting blade 23.

As shown in FIGS. 3 and 8, the converter mechanism 40 also includes an auxiliary apparatus drive shaft 55 connected with the frame 41 of the converter mechanism 40. The drive shaft 55 includes a threaded guide 56 and a bearing 54 connected with the lower portion of the threaded guide 55 and frame 41 of the converter mechanism 40. An auxiliary apparatus drive pulley 57 is rotatably connected with the apparatus drive shaft 55. The apparatus drive pulley 57 includes a generally circular outer wall 59 having a groove 58. A first endless belt 150 is connected with the drive pulley 57 and with the coupling pulley 80 (FIGS. 3–4 and 7–8). The drive pulley 57 has an upper cylindrical arm 48 which extends vertically forming the upper portion of the drive pulley 57. The arm 48 includes a flange 49 extending radially along the outer surface of the arm 48.

Referring again to FIGS. 3, 4 and 8, the converter mechanism 40 also includes an auxiliary apparatus attachment unit 31. The auxiliary apparatus unit 31 comprises an outer ring 155, a ring clip 160 and an inner ring 125 connected to an upper portion of the converter mechanism 40.

The inner ring 125 is connected with the arm 48 of the apparatus drive pulley 57. The inner ring 125 includes a generally cylindrical body portion 126. The body portion 126 includes a generally cylindrical upper inner lip portion 127, a shelf portion 124, and a lower lip portion 117 together defining a hollow interior portion (FIG. 8). The shelf portion 124 is generally circular having a circular inner edge portion 129 defining a hole 114 positioned in the center of the shelf portion 124. The lower lip portion 117 is generally cylindrical defining a lower portion of the hollow interior having a smaller circumference than the shelf portion 124.

The upper lip portion includes notches 130 which are configured to mate with the chipper-shredder 26. A male connector 32 of the chipper-shredder 26 is inserted into the interior portion of the inner ring 25 as shown in FIG. 2. A male/female connection is formed, thereby fixedly connecting the chipper-shredder 26 with the inner ring 125. The inner ring 125 is connected such that it rotates when the coupling pulley is coupled with the engine 22 (FIG. 4). The chipper-shredder 26 is connected within the interior portion of the inner ring 125 in the embodiment of FIG. 1.

The outer ring 155 has a body 156 having a generally cylindrical outer wall 157 and a generally cylindrical inner wall 158. The inner wall 158 defines a hollow interior portion (FIG. 6). The outer ring 155 is configured to connect with the inner ring 125. The outer wall 132 of the inner ring 125 is positioned within the interior of the outer ring 155 generally adjacent to the inner wall 158 of the outer ring 155. The inner ring 125 is rotatably mounted on a bearing 134. The inner ring 125 rotates within the outer ring 155. A bearing 134 also rotatably mounts the outer ring 156 to the frame 41.

The ring clip 160 has a generally cylindrical inner wall portion 162 (FIG. 8). The inner ring 125 and the outer ring 155 are connected with the ring clip 160 within the interior of these, with the ring clip 160 maintaining the outer ring 155 and inner ring 125 in a predetermined position on the frame (FIGS. 3, 5). As shown in FIG. 8, the ring clip 160 includes an outer lower flange 161 which connects with a lower flange 154 of the outer ring 155. The ring clip 160 also has at least one and preferably a plurality of screw holes 164 in the outer flange 161 for connecting the ring clip 160 with the frame 41 of the converter mechanism 40 using screws 165 or other connecting means. (FIGS. 3, 8). Alternatively, other connecting means for securing an auxiliary apparatus to the converter mechanism, such as clips or screws can also be employed with the present invention.

A handle 90 is connected with the outer ring 155. The handle 90 includes an elongated shaft portion 94 having a hollow interior portion and a shroud portion 93 (FIGS. 2 and 8). The elongated shaft portion 94 is connected to the shroud portion 93. A post 92 is inserted through the interior portion of the elongated shaft 94. A nut 91 connects the handle shaft portion 94 and post 92 to the shroud 93 of the handle 90. A spring biases the post 92 in a first position. The ring clip 160 includes at least one and preferably a plurality of outer slots 166 configured to receive the post 92 for locking the handle 90 in predetermined positions along the outer ring 155. The handle shroud 93 has at least one screw hole 79 and preferably a plurality of screwholes 79 or other connecting means. These shroud screw holes 79 are configured to align with threaded screw holes 153 in the outer ring 155 as shown in FIG. 7. A screw 148 is inserted through each hole 79 in the handle shroud 93 and into each respective thread screw hole 153 in the outer ring 155.

The handle 90 can be rotated from a first position to a second position by removing the post 92 from the first slot and rotating the handle 90. The post 92 can be inserted into a second slot to lock the handle 90 in a second predetermined position. The handle 90 is connected with the outer ring 128 such that rotating the handle 90 thereby rotates the outer ring 128. A third elevator guide 135 is connected with the frame 41 of the converter mechanism 40 (FIG. 3). The third elevator guide 135 also has a threaded guide 136 and upper and lower bearings 137, 138 connected with the frame 41 at, respectively, the upper and lower portions of the threaded guide 136.

The third elevator guide 135 also includes a third chain sprocket 120 connected to the third threaded guide 135 (FIG. 7). The third chain sprocket 120 includes teeth 121 or other engaging means to engage the chain 122. The chain 122 is also rotatably connected with the first chain sprocket 115, second chain sprocket 118, and third chain sprocket 120 (FIGS. 3 and 7). The links 123 of the chain 122 meshingly engage with the teeth of the first chain sprocket 115, second chain sprocket 118 and third chain sprocket 120.

An actuating pulley 170 is fixedly connected with the upper end portion of the threaded guide 136 of the third elevator guide 135. An actuating endless belt 171 is connected with the actuating pulley 170 and the outer wall of the outer ring 155.

A first safety pulley 140 is also connected to the third elevator guide 135, preferably in an upper portion of the threaded guide 136 (FIG. 8). The first safety pulley 140 is connected with a safety drive endless belt 141 and with a second safety pulley 142 rotatably connected with the converter mechanism 40. The second safety pulley 142 includes a hole 147 in an outer wall portion. A first cable 144 is connected with the second safety pulley 142 and is also connected with a cable connector 146 and the engine ignition 21. The cable connector 146 connects the first cable 144 with the engine ignition 21.

The multi-functional lawn mower 20 is operated such that the converter mechanism 40 is in its first position to power the cutting blade 23 and in its second position to power the chipper-shredder 26. In the first position (FIG. 6), the engaging gear 70 is engaged with the gearing unit 64 of the blade sleeve 60 such that the engine 22 is coupled with the cutting blade 23 so that the engine 22 can drive the cutting blade 23. When the converter mechanism 40 is in its first position, the engaging gear 70 is not engaged with the coupling pulley 80, therefore, the chipper-shredder 26 is not coupled with the engine shaft 24 such that the engine 22 cannot drive the chipper-shredder 26.

Alternative means for actuating the converter mechanism can be employed. For example, a knob rotatably connected to at least one of the first elevator guide and second elevator guide can rotate the elevator guides to actuate the elevator arm between various positions as described herein. Further, means for actuating movement of the engaging gear between the first position and second position can be attached to the auxiliary attachment unit of the converter mechanism, such that attaching the auxiliary apparatus, such as the chipper-shredder, to the frame of the convector mechanism and rotating the auxiliary apparatus attachment actuates the converter mechanism between the first and second position.

Many auxiliary apparatus as described herein can be configured with a male connector 32 illustrated herein which can be inserted into the inner ring 125 of the converter mechanism 40 in its first position (FIGS. 2, 6). As described, the chipper-shredder 26 is inserted into the inner ring 125 and rotated to lock the auxiliary apparatus in place. The notches 130 of the inner ring 125 (FIG. 2) receive ribs 35 or other locking means on the chipper-shredder 26 which lock the chipper-shredder 26 in place. Various means of locking the apparatus in place can be utilized in alternative embodiments, including rotating the outer ring or the auxiliary apparatus itself to lock the auxiliary apparatus in place.

The handle 90 is then employed to actuate the engaging gear 70 of the converter mechanism 40 to the second position. In the embodiment shown in FIG. 3, the handle 90 which is connected with the outer ring 155, is rotated about the inner ring 125 a predetermined angular distance. Preferably (FIGS. 3, 4) the handle 90 is rotated almost 360 degrees.

Rotating the handles 90 a predetermined angular distance rotates the outer ring 155, which in turn rotates the actuating endless belt 171 attached to the outer ring 155. Rotating the actuating endless belt 171 thereby rotates the actuating pulley 170 connected with the third elevator guide 135. The third elevator guide 135 and attached third chain sprocket 120 thereby rotates. Rotating the third chain sprocket 120 rotates the chain 122. The chain 122 then rotates the first chain sprocket 115 and second chain sprocket 118, thereby rotating the second and first elevator guides 105, 110. As the first and second elevator guides 105, 110 rotate, the elevator arm 95 moves from its first position upwardly towards its second position (FIG. 3).

With the engaging gear 70 engaged with the coupling pulley 80 and with the sleeve 50 in the second position (FIG. 4), the engine 22 is coupled with the chipper-shredder 26. As the engine 22 drives the engine shaft 24, the sleeve 50 rotates in unison with the engine shaft 24. The sleeve 50 also rotates the engaging gear 70 connected therewith. The engaging gear 70 then rotates the coupling pulley 80. The coupling pulley 80 thereby rotates the endless belt 150 connected to the coupling pulley 80. The endless belt 150 rotates the apparatus drive pulley 57. The drive pulley 57 rotates with the apparatus drive shaft 55, thereby rotating the inner ring 125. The chipper-shredder 26 connected with the inner ring 125 thereby is rotationally powered by the engine 22. As the engine rotates the chipper-shredder 26, the cutting blade is not coupled with the engine 22 such that the engine 22 does not rotate the cutting blade 23.

The converter mechanism 40 can be configured (FIG. 7) to transfer power from the engine shaft 24 to the auxiliary apparatus such as the chipper-shredder 26, at various speeds.

Preferably, the engine 22 is coupled with the chipper-shredder 26 in a 1:1 ratio between the engine shaft 24 and the chipper-shredder 26. However, in other embodiments, the rotational rate of the auxiliary apparatus in relation to the engine can be varied by gearing and other speed control means known to one of ordinary skill in the art and the details of which are not described herein.

When use of the chipper-shredder 26 is complete, it can be disconnected. To remove the chipper-shredder 26, the handle 90 is moved to its first position by rotating in an opposite direction from the direction of the initial rotation. In rotating this handle 90 from the second to first position, the belt 171 and thereby the actuating pulley 170 are rotated, thereby rotating the third elevator guide 135 in the same direction. Rotating the third elevator guide 135 likewise rotates the chain 122 connected with the first and second elevator guides 105, 110 such that the first and second elevator guides 105, 110 rotate and move the elevator arm 95 downward from its second position to its first position. The engaging gear 70 travels with the elevator arm from its second to its first position (FIG. 6). The converter mechanism 40 is thus moved from its second to first position.

Returned to its first position, the engaging gear 70 again engages the blade sleeve 60, thereby recoupling the engine 22 with the cutting blade 23 such that the engine 22 drives the cutting blade 23 and does not rotate the chipper-shredder 26.

As described, the converter mechanism 40 preferably includes an auxiliary apparatus safety mechanism 151 connected with the engine 22. Actuating the handle 90 rotates the first safety pulley 140, thereby rotating the safety endless belt 141 which, in turn, rotates the second safety pulley 142 (FIG. 8). Rotating the second safety pulley 142 in a first direction pulls the first cable 144 connected with the engine ignition from a first to second position, thereby allowing the engine 22 to start. As such, rotating the handle 90 from the first to second position moves the auxiliary apparatus safety mechanism 151 from a locked to unlocked position, thereby allowing the engine 22 to start and drive the chipper-shredder 26. The chipper-shredder 26 cannot be driven by the engine 22 when the auxiliary apparatus safety mechanism 151 is in the locked position. However, the engine 22 can drive the cutting blade 23 when the auxiliary apparatus safety mechanism 151 is in the locked position. Other means of activating such an auxiliary apparatus safety mechanism, such as an exterior lever or handle, can be utilized in connection with the auxiliary apparatus.

The lawn mower 20 is also preferably provided with a cutting blade safety mechanism 145 connected to the engine 22 to prevent engaging the cutting blade 23 when the cutting blade safety mechanism 145 is locked. As such, the engine 22 cannot be started without engaging the cutting blade safety mechanism 145 with means such as a lever 37 attached to the handle 90 or other safety mechanism if an auxiliary apparatus is not attached. A second cable 148 is connected with the cable connector 146 and an engine cutting blade safety mechanism (not shown) for controlling use of the engine 22 to drive the cutting blade 23. This engine cutting blade safety mechanism is provided in this embodiment as a second cable 148 connected with the engine ignition for driving the cutting blade 23 and with the lever 37 on the handle 36 of the lawn mower 20 (FIG. 1). As explained, actuating this lever 37 enables the engine 22 to be started to rotate the cutting blade 23. Alternatively, other engine cutting blade safety mechanisms would be provided which could be actuated to control the rotation of the cutting blade separately from powering the auxiliary apparatus known to one of ordinary skill in the art.

When the converter mechanism 40 is actuated to its second position by rotating the handle 90, the first and second safety pulleys 140, 142 are rotated, actuating the auxiliary apparatus safety mechanism 151 to its unlocked position.

Returning the converter mechanism 40 to its first position actuates the auxiliary apparatus safety mechanism 151 to a locked position and prevents the engine 22 from driving the chipper-shredder.

Figure 12:
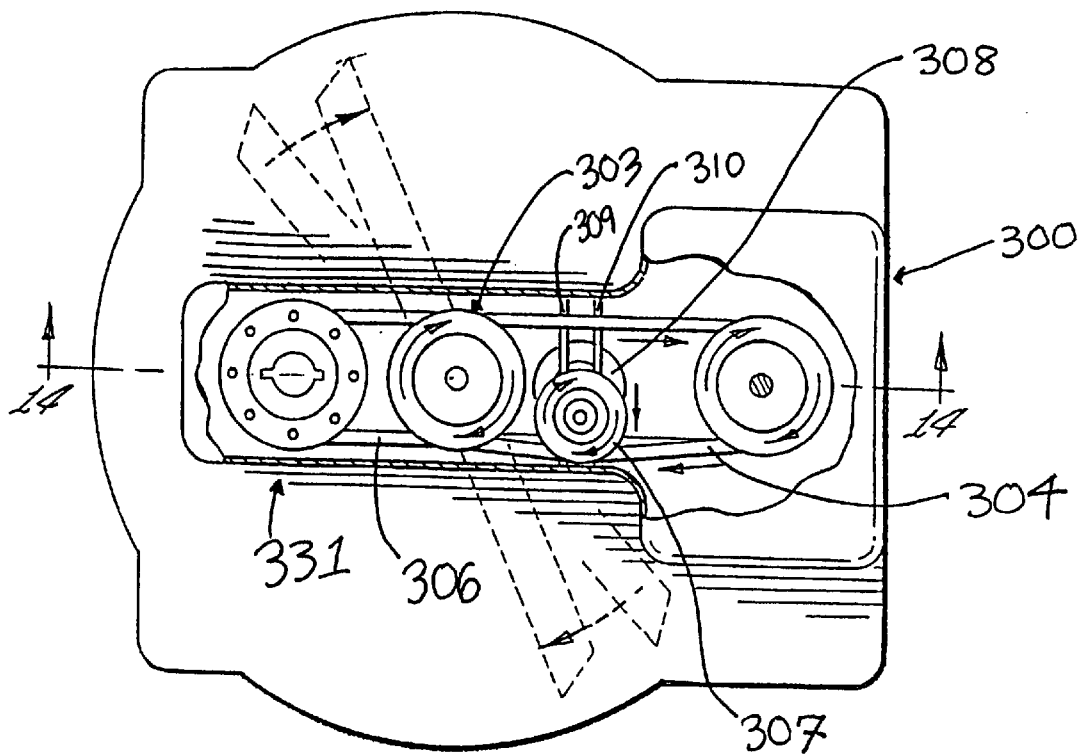
FIG. 12 is a top view of another embodiment of the converter mechanism of the multi-functional lawn mower.
Figure 13:
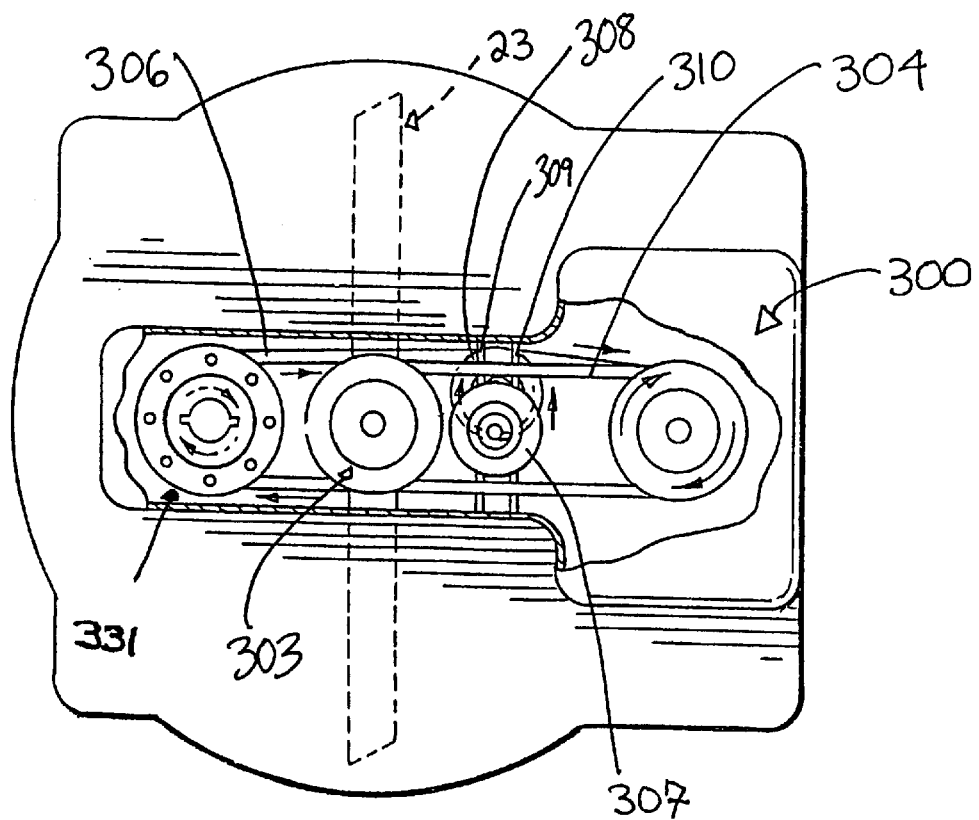
FIG. 13 is a top view of the converter mechanism of FIG. 12.

Illustrated in FIGS. 12–14 is an alternative embodiment of the multi-functional lawn mower including a converter mechanism 300. The multi-functional lawn mower includes an engine (not shown) connected on the frame 28 proximally above the platform 29 and with the converter mechanism 300 similar to that described with respect to the converter mechanism 40 of the embodiment shown in FIG. 3. The converter mechanism 300 is connected with the platform 29 and the engine shaft 24 also in a similar manner to that described herein.

The converter mechanism 300 includes a frame 311 and a blade sleeve 312 rotatably connected with the frame 311 (FIG. 14). The cutting blade 23 is connected with the blade sleeve 312 by a bolt 313 or other fastener such that the cutting blade 23 rotates with the blade sleeve 312 during operation. A cutting blade pulley 303 or other similar engine blade connector is rotatably connected with the blade sleeve 312.

The converter mechanism also includes a first drive pulley 301 and a second drive pulley 302, each of which is rotatably connected with the engine shaft 24 (FIG. 14). The first drive pulley 301 is disposed above and proximally closer to the engine than the second drive pulley 302. The drive pulleys 301 and 302 can be disposed in alternative positions relative to one another.

A blade drive endless belt 304 is connected with the first drive pulley 301 and with the cutting blade pulley 303 (FIGS. 12–13). The first drive pulley 301 is rotated by the engine shaft 24, and thereby rotates the blade drive endless belt 304 when the belt 304 is sufficiently tensioned.

The converter mechanism 300 also includes an auxiliary apparatus pulley 305 rotatably connected with a shaft 315 (FIG. 14) of an auxiliary apparatus unit 331 as or other auxiliary apparatus drive means similar to the auxiliary apparatus unit 31 previously described herein. The auxiliary apparatus pulley 305 can be connected to other configurations of auxiliary apparatus units. An auxiliary apparatus drive endless belt 306 or other flexible member is connected with the auxiliary apparatus pulley 305 and the second drive pulley 302.

Other flexible members including chains, ropes, or wires can be employed in place of the endless belts 304 and 306.

Referring still to FIGS. 12–14, the converter mechanism 300 further includes a cutting blade idler pulley 307 and an auxiliary apparatus idler pulley 308, each movably connected with the converter mechanism frame 311. The idler pulleys 307, 308 are slideably mounted with idler pulley guides 309, 310 or other means for moving the idler pulleys 307, 308 between a first and a second position (FIGS. 12–14). The idler pulley 307 is preferably operatively connected by a fastening mechanism 314 with the idler pulley 308 such that moving the idler pulley 307 will move the auxiliary apparatus idler pulley 308 approximately an equal distance.

In the first cutting blade engaged position, shown in FIG. 12, the cutting blade idler pulley 307 engages the inner edge of the blade drive endless belt 304 and the auxiliary apparatus idler pulley 308 does not engage the auxiliary apparatus drive endless belt 306. Alternatively the cutting blade idler pulley 307 can engage the outer or other edges of the blade drive endless belt 304. In this first position, the cutting blade idler pulley 308 contacts the cutting blade drive endless belt 304, thereby tightening the endless belt 304 to a predetermined tension that is sufficient to engage or couple the endless belt 304 with the first drive pulley 301 and rotate the endless belt 304 as the engine shaft 24 rotates. The endless belt 304 rotates the cutting blade pulley 303, and thereby rotates the cutting blade 23. In this first position, the auxiliary apparatus drive endless belt 306 remains at a predetermined tension that is insufficient to engage the second drive pulley 302; therefore, the endless belt 306 does not rotate. The auxiliary apparatus mechanism 331 is, therefore, not engaged or coupled with the engine shaft 24 in this first cutting blade engaged position and does not rotate.

When the idler pulleys 307, 308 are in a second auxiliary apparatus engaged position shown in FIG. 13, the auxiliary apparatus idler pulley 308 engages the inner edge of the auxiliary endless belt 306, and the cutting blade idler pulley 307 does not engage the cutting blade endless belt 304. The auxiliary apparatus idler pulley 308 can be provided to engage the outer edge or other parts of the auxiliary endless belt 306. In this second position, the auxiliary apparatus idler pulley 308 contacts the endless belt 306, thereby tightening the endless belt 306 to a predetermined tension that is sufficient to engage or couple the endless belt 306 with the second pulley 302 and rotate the endless belt 306 as the engine shaft 24 rotates. In this second auxiliary apparatus engaged position, the cutting blade drive endless belt 304 is also tightened to a predetermined tension that is insufficient to engage the first pulley 301; therefore, the endless belt 304 does not rotate with the engine shaft 24. The cutting blade 23 is, therefore, not engaged with the engine shaft 24 in this second auxiliary apparatus engaged position and does not rotate. Other tensioning means can be employed in place of the idler pulleys 307, 308 (FIGS. 12–14) including, but not limited to, other rotary tensioning members, tightening bars, rods or other tensioning means.

The idler pulleys 307, 308 are connected to a handle (not shown) or other actuating means for moving the idler pulleys 307, 308 from the first position to the second position. The handle extends beyond the frame 311 of the converter mechanism 300 to be actuated manually. Other manual or automatic actuating mechanisms can be provided to actuate the idler pulleys 307 and 308 between the first and second positions.

Alternatively, the idler pulleys 307 and 308 can be connected to a rod in place of the idler pulley guides 309, 310. The rod can be slideably mounted with the frame 311 of the converter mechanism 300 with a sliding post or other slidable mounting mechanism. The handle of the rod extends through the frame of the converter mechanism to be slid manually between a first position and second position. With the rod in its first position, the cutting blade idler pulley 307 tightens the blade drive endless belt 304 to a sufficient tension such that the converter mechanism 300 is in the cutting blade engaged position. Likewise, the auxiliary apparatus idler pulley 308 tightens the endless belt 306 to a sufficient tension such that the auxiliary apparatus engages with the engine shaft 24 and fails to rotate as described herein. With the rod moved to its second position, the auxiliary apparatus idler pulley 308 tightens the endless belt 306 to a sufficient tension such that the auxiliary apparatus unit 331 engages to couple with the engine shaft 24 and, thus, the converter mechanism 300 resides in the auxiliary apparatus engaged position. The idler pulley 307 tightens the belt 304 to a predetermined tension such that the cutting blade 23 engages with the engine shaft 24 and fails to rotate.

Alternatively, the idler pulleys 307, 308 can be connected with the auxiliary apparatus mechanism 31 or other auxiliary apparatus drive means to be actuated from the first position to the second position by the movement of a handle or other actuating means connected with the auxiliary apparatus mechanism similar to the handle 90 and auxiliary mechanism 31 described herein with respect to FIGS. 1–10. The idler pulleys 307, 308 can also be provided as various engaging means for separately contacting and tightening the endless belts 304, 306 to provide the predetermined tension sufficient to separately engage, and thereby rotate the cutting blade 23 in the first position, without rotating the auxiliary apparatus, and rotate the auxiliary apparatus in the second position, without rotating the cutting blade 23. For example, alternatively, the pulleys 307, 308 can be provided as gears to engage with a chain or gear-driven mechanism to separately engage the endless belts 304, 306 or other flexible members.

One such embodiment utilizes two separate attachments which would be manually connected with the engine shaft. An implement drive attachment including a shaft with a gear or engaging means fixedly connected with the shaft is utilized. The gear would engage the gearing unit connected with the coupling pulley as described herein to drive an auxiliary apparatus. When this implement drive attachment would be inserted over the existing engine shaft, the engaging gear would engage the gearing unit within the coupling pulley and thereby drive the auxiliary apparatus as described herein.

When the implement drive attachment would be removed, a second cutting blade attachment would be connected to the existing shaft and include gears or engaging means for engaging the sleeve to couple the cutting blade with the engine. The blade attachment would include a threaded slot or other connection means in a lower portion for connecting with the cutting blade.

A further alternative embodiment of the multi-functional lawn mower including a converter mechanism 200 is illustrated in FIGS. 9 and 10. The multi-functional lawn mower includes an engine which is movably mounted to the frame by a hinged pivot mount 222 or other movable connecting means utilized at the front of the engine. This pivot mount 222 or other movable connection means allows the engine to move laterally between a first position and a second position via the pivot point of the engine. A handle or other actuating means is located at the rear of the engine to move the engine between the first and second position and lock the engine in a first or second position a predetermined distance apart, preferably approximately three inches apart.

The converter mechanism 200 includes an engaging gear 201 as described with respect to FIGS. 1–8 connected with the lower end portion of the engine shaft 224. The converter mechanism further includes a blade sleeve 207, as described with respect to the embodiment of FIGS. 1–8. The blade sleeve 207 is rotatably mounted with the frame 209 of the lower portion of the converter mechanism 200 by a bearing 225. A cutting blade drive pulley 203 is connected with the upper end of the blade sleeve 207 such that the cutting blade drive pulley 203 and blade sleeve 207 rotate generally in unison. A cutting blade drive endless belt 202 is connected with the cutting blade drive pulley 203.

The converter mechanism also includes a first shaft 204 rotatably connected with the frame 209 of the converter mechanism 200 by an upper bearing 205 and lower bearing 206. A pulley 208 is rotatably connected with the first shaft 204 and with the endless belt 202 such that the pulley 208 generally rotates in unison with the first shaft 204. A blade drive gearing mechanism 210 is rotatably connected with the shaft 204 such that the gearing mechanism 210 rotates generally in unison with the shaft 204. The gearing mechanism 210 includes teeth or other engaging means on an outer surface. Rotating the gearing mechanism 210 thereby rotates the pulley 208, endless belt 202, and cutting blade drive pulley 203. This in turn rotates the blade sleeve 207 and the attached cutting blade (not shown).

The converter mechanism 200 also includes a second shaft 212 rotatably connected with the frame 209 of the converter mechanism 200 by an upper bearing 213 and lower bearing 214 as described herein with respect to the embodiment of FIGS. 1–8. An auxiliary apparatus drive pulley 216 is rotatably connected with the second shaft 212 and with an endless belt 217 connected with an outer ring 230 of an auxiliary apparatus drive mechanism 224 (FIG. 9) such as described with reference to the embodiment of FIGS. 1–8. The pulley 216 generally rotates in unison with the second shaft 212.

The converter mechanism 200 also includes an auxiliary apparatus drive gearing mechanism 218 rotatably connected with the second shaft 212 such that the gearing mechanism 218 rotates generally in unison with the shaft 212. The gearing mechanism 218 includes teeth 219 or other engaging means on an outer surface.

Rotating the gearing mechanism 218 thereby rotates the pulley 216, endless belt 217, and in turn, the auxiliary apparatus drive shaft connected with an auxiliary apparatus as described with reference to the embodiment illustrated in FIGS. 1–8.

With the engine in the first position, the engaging gear 201 engages the teeth 211 of the cutting blade drive gearing mechanism 210 coupling the engine with the cutting blade. In the first position, the engaging gear 201 is not positioned to engage the auxiliary apparatus drive gearing mechanism 218. Therefore, the engine is not coupled with an auxiliary apparatus to drive the auxiliary apparatus.

The engine is moved to a second position in which the engaging gear 201 engages the auxiliary apparatus engaging gear 218 coupling the engine with the auxiliary apparatus to drive the auxiliary apparatus. In the second position, the engaging gear 201 is not positioned to engage the cutting blade drive gearing mechanism 210 such that the engine is not coupled with the cutting blade and the cutting blade does not rotate.

A further embodiment of the multi-functional lawn mower having a converter mechanism utilizes separate shafts for driving an auxiliary apparatus and a cutting blade from a fixed engine. A first cutting blade attachment connected with the cutting blade and a second auxiliary apparatus drive attachment connected with the auxiliary apparatus are utilized. The first and second attachments are separately slid or otherwise moved into separate contact with a gear mechanism or other engaging means connected with a stationary engine shaft to separately couple the engine with the cutting blade and with the auxiliary apparatus. In this embodiment, a first gear mechanism connected with the auxiliary apparatus drive attachment could be moved into contact with a gear unit connected with the engine shaft. A second gear mechanism or other engaging means connected with the second cutting blade drive attachment could then separately be moved into engagement with the engaging gear connected with the engine shaft. A spacing bar or other separation means could be connected with the cutting blade drive attachment and the auxiliary apparatus drive attached to maintain a predetermined distance between the attachments such that the cutting blade 23 drive shaft and the auxiliary apparatus drive shaft could not simultaneously engage the engine shaft.

A further embodiment of the multi-functional lawn mower includes a converter mechanism according to the present invention which is manually moved between a first and second position to separately engage or couple the engine with the cutting blade and with an auxiliary apparatus. The converter mechanism includes a sleeve added to the engine shaft, a blade sleeve, an engaging gear and coupling pulley connected with the frame of the converter mechanism as described in reference to the embodiment of FIGS. 1–8. The converter mechanism in this embodiment does not include an elevator arm and elevator guides as described in FIGS. 1–8. In their place, a first gearing mechanism or other engaging means is added to the exterior of the lower end of the sleeve and a second gearing mechanism or other engaging means is added to the interior surface of the blade sleeve. In the first lower position, the first and second gearing mechanisms on the sleeve and the blade sleeve engage to couple the engine shaft with the cutting blade and not couple the engine with the auxiliary apparatus. In the first position the engaging gear is not engaged with the blade sleeve or with the coupling pulley. When the blade sleeve is pushed upward into the second position, the engaging gear is pushed upwardly to engage the gear mechanism of the coupling pulley. The first and second gear mechanisms on the sleeve and blade sleeve are not engaged in the second position such that the engine does not rotate the cutting blade. In the second position, the engine shaft is thus coupled to drive the coupling pulley and not coupled to drive the cutting blade.

Figure 11:
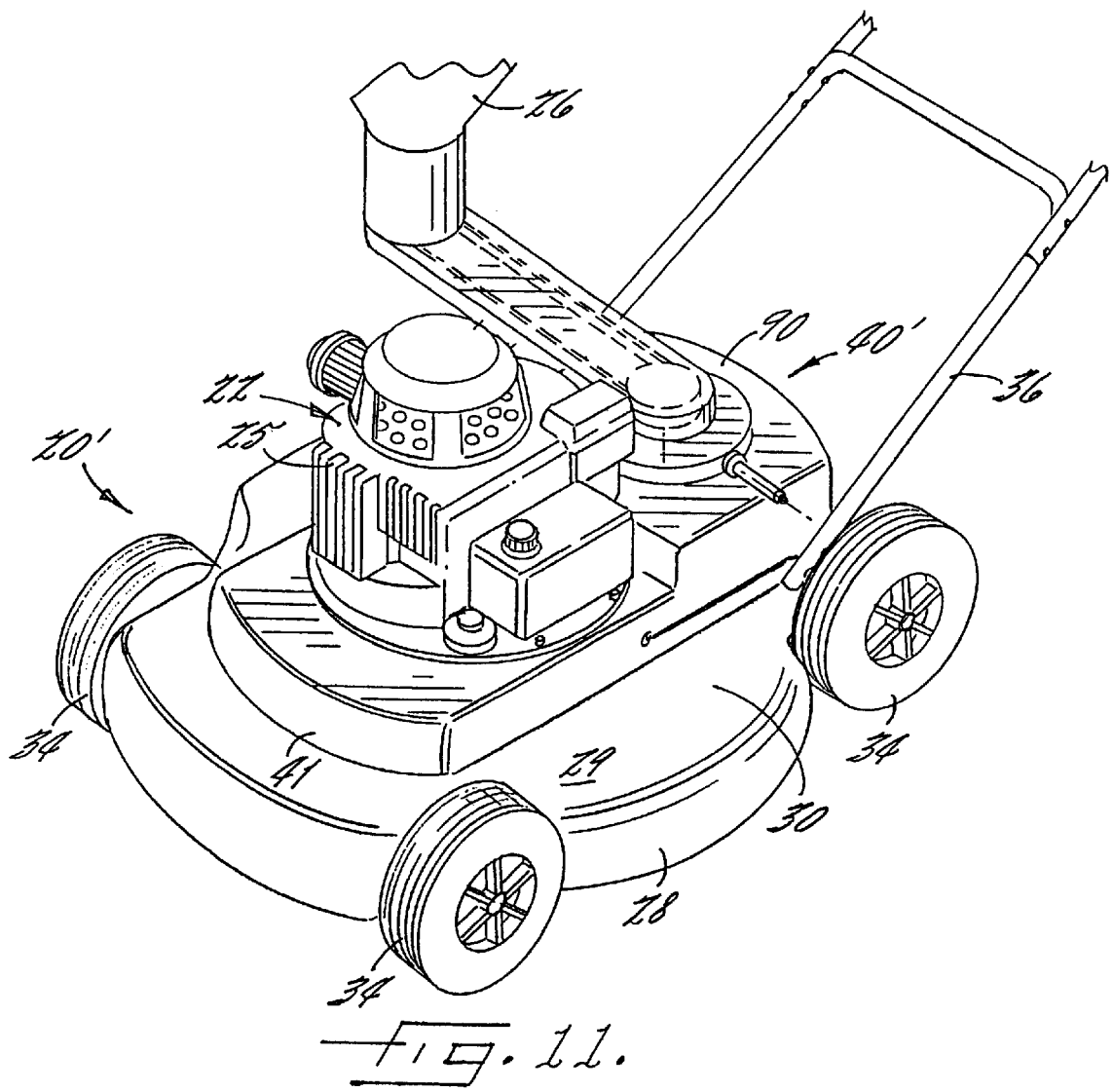
FIG. 11 is a perspective view of a further embodiment of the multi-functional lawn mower according to the present invention having an auxiliary apparatus attached rearwardly of the engine.

Another embodiment of the multi-functional lawn mower 20' is illustrated in FIG. 11. The multi-functional lawn mower 20' includes a convector mechanism 40' as described with reference to FIGS. 1–8 which is attached to the frame 28 rearward of the engine 22. A chipper-shredder 26 is shown attached to the converter mechanism 40' rearward of the engine 22. (FIG. 11).

It is contemplated that the converter mechanism according to the present invention could be utilized to adapt an existing lawn mower to provide a multi-functional lawn mower apparatus. To do so, the cutting blade 23 of a lawn mower 20 such as that illustrated herein is removed from the engine shaft 24.

The converter mechanism 40 is then connected with the engine 22 as described. In the preferred embodiment, the engine 22 is also removed and the converter mechanism 40 is mounted on the platform 29 of the lawn mower 20. The engine 22 is then preferably placed on the top portion 43 of the converter mechanism 40 such that the engine shaft 24 extends downwardly through a hole 42 in the top portion 43 of the converter mechanism 40 and through an opening or hole 47 in the bottom portion 46 of the converter mechanism 40.

The converter mechanism 40 and engine 22 are then preferably connected to the platform 29 of the lawn mower 20. The cutting blade 23 is then reconnected. The converter mechanism 40 enables the separate engagement of the engine 22 with the cutting blade 23 in a first position and of the engine 22 with the chipper-shredder 26 or other auxiliary apparatus in the second position. The multi-functional lawn mower having a converter mechanism as described herein provides a lawn mower with a single power source which can separately and thereby more safely power a cutting blade and a variety of auxiliary apparatus lawn or maintenance equipment from this single engine or power source. Further the multi-functional lawn mower provided herein reduces the cost, materials and work associated with multiple power sources of separate lawn care or maintenance equipment. A more versatile, cheaper and safer multi-functional lawn mower having a converter mechanism is hereby provided according to the present inventor.

In the drawings and specification, there have been disclosed typical preferred embodiments of the invention and, although specific terms are employed, they are used in a generic and descriptive sense only and not for the purposes of limitation, the scope of the invention being set forth in the following claims.

That which is claimed is:

1. A rotary lawn mower adapted to separately power an auxiliary apparatus comprising:
    a platform;
    front and rear wheels attached to and supporting said platform, an auxiliary drive shaft fixedly connected to said platform and adapted to be driving connected to the auxiliar apparatus;
    a cutting blade;
    an engine connected to said platform, said engine having an engine shaft for supplying power to said cutting blade and said auxiliary drive shaft, said engine shaft extending from said engine in a fixed generally vertical position below said platform; and
    a converter mechanism connected with said engine for separately transferring power from said engine either to said cutting blade and or to the auxiliary apparatus comprising:
        dual coupling means operatively connected to said engine for coupling said engine shaft with said cutting blade in a first position and for separately coupling said engine shaft with said auxiliary drive shaft in a second position, so that when said dual coupling means is in said first position, said engine shaft is coupled to drive said cutting blade for movement thereof and is not positioned for coupling with said auxiliary drive shaft for movement thereof and when said dual coupling means is in said second position, said engine shaft is coupled with said auxiliary drive shaft for movement thereof and is not positioned for coupling with said cutting blade for movement thereof.

2. A rotary lawn mower as defined in claim 1, wherein said dual coupling means fluther comprises means for separately coupling said engine shaft with said cutting blade and with said auxiliary drive shaft, said means for separately coupling slideably mounted on said engine shaft to move between said first position and said second position.

3. A rotary lawn mower as defined by claim 1, wherein said converter mechanism further comprises a safety mechanism connected to said engine and said dual coupling means, said safety mechanism configured to move between a locked position and an unlocked position such that said engine is prevented from driving the auxiliary apparatus when said safety mechanism is in its locked position and said engine drives the auxiliary apparatus when said safety mechanism is in its unlocked position.

4. A rotary lawn mower as defined by claim 3, wherein said converter mechanism further comprises actuating means connected to said dual coupling means for actuating separate engagement of said engine shaft with said cutting blade in said first position and said engine with the auxiliary apparatus in said second position, and wherein said safety mechanism is in said locked position when said dual coupling means is in said first position, said safety mechanism is in said unlocked position when said dual coupling means is in said second position, and said safety mechanism is connected with said actuating means such that said safety mechanism moves from said locked position to said unlocked position when said actuating means moves said dual coupling means from said first position to said second position.

5. A rotary lawn mower as defined in claim 1, in combination with an auxiliary apparatus attached to said dual coupling means such that said engine shaft is coupled to drive the auxiliary apparatus when said dual coupling means is in its second position.

6. A rotary lawn mower as defined in claim 5, wherein the auxiliary apparatus is selected from the group comprising: an air blower, a pressure washer, a wood chipper, an electricity generator, a pump, a log splitter, a compressor, a power auger, and a stump grinder.

7. A rotary lawn mower adapted to separately power an auxiliary apparatus comprising:
    a platform:
    front and rear wheels attached to an supporting said platform;
    a cutting blade;
    an engine connected to said platform, said engine having an engine shaft for supplying power to said cutting blade and the auxiliary apparatus, said engine shaft extending from said engine generally vertically below said platform; and
    a converter mechanism connected with said engine for separately transferring power from said engine either to said cutting blade and or to the auxiliary apparatus comprising:
        dual coupling means operatively connected to said engine for coupling said engine shaft with said cutting blade in a first position and for separately coupling said engine shaft with the auxiliary apparatus in a second position, so that when said dual coupling means is in said first position, said engine shaft is coupled to drive said cutting blade for movement thereof and is not positioned for coupling with the auxiliary apparatus for movement thereof and when said dual coupling means is in said second position, said engine shaft is coupled with the auxiliary apparatus for movement thereof and is not positioned for coupling with said cutting blade for movement thereof; said dual coupling means further including;
        a first flexible member movably connected with said engine shaft and said cutting blade;
        a second flexible member movably connected with said engine shaft and said auxiliary apparatus;
        first tensioning means connected with said frame for selectively increasing tension in said first flexible member, said first tensioning means being movable between said first and second positions, and being positioned relative to said first flexible member such that movement to said first position causes said first tensioning means to increase the tension in said first flexible member sufficiently to couple said engine shaft with said cutting blade for movement thereof, and such that movement of said first tensioning means to said second position causes said first tensioning means to relax said first flexible member such that the tension in said first flexible member is insufficient to couple said engine shaft with said blade for movement thereof; and second tensioning means connected with said frame for selectively increasing tension in said second flexible member, and operatively connected with said first tensioning means for movement between said first and second positions, said second tensioning means being movable between first and second positions, and being positioned relative to said second flexible member such that movement to the second position causes said second tensioning means to increase the tension in said flexible member sufficiently to couple said engine shaft with said auxiliary apparatus for movement thereof, and such that movement of said second tensioning member to the first position causes said second tensioning means to relax said second flexible member such that the tension in said second flexible member is insufficient to couple said engine shaft with said auxiliary apparatus for movement thereof.

8. A rotary lawn mower as defined in claim 7, wherein said first tensioning means comprises:

a rotary member rotatably connected with said frame and engageable with said first flexible member in said first position; and said second tensioning means comprises:

a rotary member rotatably connected with said frame and engageable with said first flexible member in said second position.

9. A rotary lawn mower as defined in claim 7, said first tensioning means and said second tensioning means are movable relative to said frame along a common path from said first position to said second position.

10. A rotary lawn mower adapted to separately power an auxiliary apparatus comprising:

a platform;

front and rear wheels attached to and supporting said platform;

a cutting blade;

an engine connected to said platform, said engine having an engine shaft for supplying power to said cutting blade and the auxiliary apparatus, said engine shaft extending from said engine generally vertically below said platform; and a converter mechanism connected with said engine for separately transferring power from said engine to said cutting blade in a first position and to the auxiliary apparatus in a second position comprising:

a frame connected to said engine, a first flexible member movably connected with said engine shaft and said cutting blade;

a second flexible member movably connected with said engine shaft and said auxiliary apparatus;

auxiliary apparatus drive means connected with said second flexible member for driving an auxiliary apparatus in said second position;

first tensioning means connected with said frame for selectively increasing tension in said first flexible member, said first tensioning means being movable between first and second positions corresponding to said first and second positions of said converter mechanism, and being positioned relative to said first flexible member such that movement to the first position causes said first tensioning means to increase the tension in said first flexible member sufficiently to couple said engine shaft with said engine blade for movement thereof, and such that movement of said first tensioning means to said second position causes said first tensioning means to relax said first flexible member such that the tension is said first flexible member is insufficient to couple said engine shaft with said blade for movement thereof; and a second tensioning means connected with said frame for selectively increasing tension in said second flexible member, and operatively connected with said first tensioning means for movement between said first and second positions, said second tensioning means being movable between first and second positions corresponding to said first and second positions of said converter mechanism, and being positioned relative to said second flexible member such that movement to the second position causes said second tensioning means to increase the tension in said second flexible member sufficiently to couple said engine shaft with said auxiliary apparatus for movement thereof, and such that movement of said second tensioning member to the first position causes said second tensioning means to relax said second flexible member such that the tension in said second flexible member is insufficient to couple said engine shaft with said auxiliary apparatus for movement thereof.

11. A rotary lawn mower as defined in claim 10, wherein said first tensioning means comprises:

a rotary member rotatably connected with said frame and engageable with said first flexible member in said first position; and said second tensioning means comprises:

a rotary member rotatably connected with said frame and engageable with said first flexible member in said second position.

12. A rotary lawn mower as defined in claim 10, said first tensioning means and said second tensioning means are movable relative to said frame along a common path from said first position to said second position.

13. A rotary lawn mower as defined by claim 10, wherein said converter mechanism further comprises a safety mechanism connected with said engine, said first tensioning means and said second tensioning means, said safety mechanism configured to move between a locked position and an unlocked position such that said engine is prevented from driving the auxiliary apparatus when said safety mechanism is in the locked position and said engine drives the auxiliary apparatus when said safety mechanism is in the unlocked position.

14. A rotary lawn mower as defined by claim 13, wherein said converter mechanism further comprises actuating means connected with said first tensioning means and said second tensioning means for actuating separate engagement of said engine shaft with said cutting blade in said first position and said engine with the auxiliary apparatus in said second position, and wherein said safety mechanism is in the locked position when said first tensioning means and said second tensioning means are in said first position, said safety mechanism is in the unlocked position when said first tensioning means and said second tensioning means are in said second position, and said safety mechanism is connected with said actuating means such that said safety mechanism moves from said locked position to said unlocked position when said actuating means moves said first tensioning means and said second tensioning means from said first position to said second position.

15. A rotary lawn mower as defined in claim 10, in combination with an auxiliary apparatus attached to auxiliary apparatus drive means such that said engine shaft is coupled to drive the auxiliary apparatus when said second tensioning means is in its second position.

16. A rotary lawn mower as defined in claim 15, wherein the auxiliary apparatus is selected from the group comprising: an air blower, a pressure washer, a wood chipper, an electricity generator, a pump, a log splitter, a compressor, a power auger, and a stump grinder.

17. A converter mechanism adapted to be connected with an auxiliary apparatus, a cutting blade and an engine of a rotary lawn mower including a platform, front and rear wheels attached to and supporting the platform, the engine connected to the platform and having an engine shaft extending from the engine below the platform in a fixed, generally vertical position for supplying power from the engine shaft either to a cutting blade or to an auxiliary power shaft fixedly connected to the platform and adapted to be drivingly connected to the auxiliary apparatus, said converter mechanism comprising:
    a frame adapted to be connected to said engine; and
    dual coupling means carried by said frame adapted for separately coupling said engine shaft with either said cutting blade or to the auxiliary power shaft of the auxiliary apparatus, said dual coupling means being shiftable between a first position and a second position so that when said dual coupling means is in said first position, said engine shaft is coupled to drive said cutting blade for movement thereof and is not positioned for coupling with the auxiliary power shaft, and when said dual coupling means is in said second position, said engine shaft is coupled with the auxiliar power shaft of the auxiliary apparatus for movement thereof and is not positioned for coupling with said cutting blade for movement thereof.

18. A converter mechanism as defined in claim 17, wherein said dual coupling means further comprise coupling means adapted for separately coupling said engine shaft with said cutting blade and with the auxiliary apparatus, said means adapted to slideably mount on said engine shaft and adapted to move between said first and said second position.

19. A converter mechanism as defined in claim 17, further comprising a safety mechanism adapted to connect to said engine and connected to said dual coupling means, said safety mechanism configured to move between a locked position and an unlocked position such that said engine is prevented from driving the auxiliary apparatus when said safety mechanism is in its locked position and said engine is enabled to drive the auxiliary apparatus when said safety mechanism is in its unlocked position.

20. A converter mechanism as defined in claim 19, further comprising actuating means connected to said dual coupling means for actuating separate engagement of said engine shaft with said cutting blade and with the auxiliary apparatus, and wherein said safety mechanism is in said locked position when said dual coupling means are in said first position, and said safety mechanism is in said unlocked position when said dual coupling means are in said second position, said safety mechanism is connected with said actuating means such that said safety mechanism moves from said locked position to said unlocked position by actuating said actuating means to move said dual coupling means from said first position to said second position.

21. A convector mechanism as defined in claim 20, wherein said dual coupling means is adapted to connect with an auxiliary apparatus such that said engine drives the auxiliary apparatus when said dual coupling means is coupled to said engine shaft in said second position.

22. A converter mechanism as defined in claim 21, wherein said dual coupling means is adapted to connect with an auxiliary apparatus selected from the group comprising: an air blower, a pressure washer, a wood chipper, an electricity generator, a pump, a log splitter, a compressor, a power auger and a stump grinder.

23. A converter mechanism as defined in claim 17, wherein said dual coupling means further comprises:
    a sleeve adapted to be connected with said engine shaft, said sleeve having engaging means on its outer surface;
    a gear connected with said frame having engaging means for engaging said sleeve in at least one position, said gear being slidable between a first position and a second position;
    a blade sleeve connected with said frame, said blade sleeve having coupling means for releasable coupling with said gear in said first position, said gear having coupling means adapted to couple with said blade sleeve in said first position;
    a pulley connected to said frame, said pulley having coupling means for releasable coupling with said gear when said gear is in said second position, said gear having coupling means for coupling with said pulley in said second position; and
    auxiliary apparatus drive means connected to said pulley for driving an auxiliary apparatus in said second position, such that when said gear is in said first position said engine shaft is coupled to drive said cutting blade for movement thereof and is not positioned for coupling with the auxiliary apparatus, and when said gear is in a second position, said engine shaft is coupled with the auxiliary apparatus for movement thereof and is not positioned for coupling with said cutting blade for movement thereof.

24. A converter mechanism as defined in claim 23, further comprising actuating means connected to said dual coupling means for actuating separate engagement of said engine shaft with said cutting blade and with the auxiliary apparatus, said actuating means comprising:
    a handle rotatably connected to said frame movable between a first handle position and a second handle position;
    at least one elevator mechanism movably connected to said handle and connected with said gear;
    such that when said handle is in said first handle position, said elevator is in said first position and when said handle is in said second handle position, said elevator is in said second position.

25. A converter mechanism as defined in claim 23, further comprising actuating means connected to said dual coupling means for actuating separate engagement of said engine shaft with said cutting blade and with the auxiliary apparatus and comprising a safety mechanism adapted to connect to said engine and connected to said auxiliary apparatus drive means, said safety mechanism configured to move between a locked position and an unlocked position such that said engine is prevented from driving the auxiliary apparatus when said safety mechanism is in its locked position and said engine is enabled to drive the auxiliary apparatus when said safety mechanism is in its unlocked position.

26. A convector mechanism as defined in claim 24, wherein said safety mechanism is connected to said handle such that, when said handle is in said first handle position, said safety mechanism is in said locked position, and when said handle is in said second handle position, said safety mechanism is in said unlocked position.

27. A converter mechanism as defined in claim 23, wherein said auxiliary apparatus drive means is adapted to connect with an auxiliary apparatus such that said engine drives the auxiliary apparatus when said auxiliary apparatus drive means is coupled to said engine shaft in said second position.

28. A converter mechanism adapted to be connected with an auxiliary apparatus, a cutting blade and an engine of a rotary lawn mower including a platform, front and rear wheels attached to and supporting the platform, the engine connected to the platform and having an engine shaft extending from the engine generally vertically below the platform for supplying power to the cutting blade connected with the engine shaft and an auxiliary apparatus, said converter mechanism for separately transferring power from the rotary lawn mower engine to the cutting blade in a first position and to the auxiliary apparatus in a second position and comprising:

a frame adapted to be connected to said engine;

a first flexible member adapted to be movably connected with said engine shaft and said cutting blade;

a second flexible member adapted to be movably connected with said engine shaft and said auxiliary apparatus;

auxiliary apparatus drive means connected to said second flexible member for driving an auxiliary apparatus in said second position;

a first connector adapted to rotatably connect with said engine shaft for transferring power from said engine shaft to said first flexible member and connected with said first flexible member, a second connector adapted to rotatably connect with said engine shaft for transferring power from said engine to said first flexible member and connected with said second flexible member, a third engine blade connector connected with said first flexible member and adapted to rotatably connect with said engine blade, first tensioning means connected with said frame for selectively increasing tension in said first flexible member, said first tensioning means being movable between first and second positions corresponding to said first and second positions of said converter mechanism, and being positioned relative to said first flexible member such that movement to the first position causes said first tensioning means to increase the tension in said first flexible member sufficiently to couple said first connector with said third engine blade connector for movement thereof, and such that movement of said first tensioning means to said second position causes said first tensioning means to relax said first flexible member such that the tension in said first flexible member is insufficient to couple said first connector with said third engine blade connector movement thereof; and a second tensioning means connected with said frame for selectively increasing tension in said second flexible member, and operatively connected with said first tensioning means for movement between said first and second positions, said second tensioning means being movable between first and second positions corresponding to said first and second positions of said converter mechanism, and being positioned relative to said second flexible member such that movement to the second position causes said second tensioning means to increase the tension in said second flexible member sufficiently to couple said first connector with said auxiliary apparatus drive means for movement thereof, and such that movement of said second tensioning member to the first position causes said second tensioning means to relax said second flexible member adapted such that the tension in said second flexible member is insufficient to couple said first engine connector with said auxiliary apparatus drive means for movement thereof.

29. A converter mechanism as defined in claim 28, wherein said first tensioning means comprises:

a rotary member rotatably connected with said frame and engageable with said first flexible member in said first position; and said second tensioning means comprises:

a rotary member rotatably connected with said frame and engageable with said first flexible member in said second position.

30. A converter mechanism as defined in claim 28, said first tensioning means and said second tensioning means are movable relative to said frame along a common path from said first position to said second position.

31. A converter mechanism as defined by claim 28, wherein said converter mechanism further comprises a safety mechanism adapted to connect with said engine, said first tensioning means and said second tensioning means, said safety mechanism configured to move between a locked position and an unlocked position such that said engine is prevented from driving the auxiliary apparatus when said safety mechanism is in the locked position and said engine drives the auxiliary apparatus when said safety mechanism is in the unlocked position.

32. A converter mechanism as defined by claim 31, wherein said converter mechanism further comprises actuating means connected with said first tensioning means and said second tensioning means adapted for actuating separate engagement of said engine shaft with said cutting blade in said first position and said engine with the auxiliary apparatus in said second position and wherein said safety mechanism is in the locked position when said first tensioning means and said second tensioning means are in said first position, said safety mechanism is in the unlocked position when said first tensioning means and said second tensioning means are in said second position, and said safety mechanism is connected with said actuating means such that said safety mechanism moves from said locked position to said unlocked position when said actuating means moves said first tensioning means and said second tensioning means from said first positions to said second positions.

33. A converter mechanism as defined in claim 28, in combination with an auxiliary apparatus attached to auxiliary apparatus drive means, said converter mechanism being adapted such that said engine shaft is coupled to drive the auxiliary apparatus when said second tensioning means is in its second position.

34. A rotary lawn mower as defined in claim 33, wherein the auxiliary apparatus is selected from the group comprising: an air blower, a pressure washer, a wood chipper, an electricity generator, a pump, a log splitter, an edger, a compressor, a power auger, and a stump grinder.

35. A method of utilizing a multi-functional lawn mover apparatus comprising the steps of:

providing an auxiliary apparatus; a lawn mover having a platform, front and rear wheels attached to and supporting said platform; an engine connected to said platform, said engine having an engine shaft extending from said engine generally vertically below said platform; a cutting blade connected with said engine apparatus; and a converter mechanism connected with said engine for separately transferring power from said engine to said cutting blade and to an auxiliary power shaft of an auxiliary apparatus comprising: a frame connected to said engine and fixedly rotatably supporting the auxiliary power shaft; a dual coupling unit adapted for coupling said engine with said cutting blade and for separately coupling said engine with said auxiliary power shaft, said dual coupling unit adapted so that when said dual coupling unit is in a first position, said engine shaft is coupled drive said cutting blade for movement thereof and not positioned for coupling with the auxiliary apparatus, and when said dual coupling unit is in a second position, said engine shaft is coupled with the auxiliary power shaft of the auxiliary apparatus for movement thereof and is not positioned for coupling with said cutting blade for movement thereof; and actuating means for actuating said dual coupling unit between said first position and said second position, said dual coupling unit being in said first position;

attaching said auxiliary apparatus to said lawn mower converter mechanism; and actuating said actuating means to move said dual coupling unit from said first position to said second position such that said engine shaft is coupled to drive said cutting blade for movement thereof and is not positioned for coupling with said auxiliary apparatus for movement thereof.

36. A method of utilizing a multi-functional lawn mower apparatus as defined in claim 35 further comprising the step of:

actuating said actuating means to move said dual coupling unit from said second position to said first position.

37. A method of utilizing a multi-functional lawn mower apparatus as defined in claim 36 further comprising the steps of disconnecting said auxiliary apparatus from said converter mechanism;

connecting a second auxiliary apparatus to said dual coupling unit; and actuating said actuating means to move said dual coupling unit from said first position to said second position.

38. A method of utilizing a multi-functional lawn mower apparatus as defined in claim 37, wherein said second auxiliary apparatus is selected from the group comprising: an air blower, a pressure washer, a chipper, an electricity generator, a pump, a log splitter, a compressor, a power auger and a stump grinder.

39. A method of utilizing a multi-functional lawn mower apparatus as defined in claim 35, wherein said step of providing a converter mechanism further comprises a safety mechanism connected to said engine and said dual coupling unit, said safety mechanism configured to move between a locked and unlocked position such that said engine is prevented from driving the auxiliary apparatus when said safety mechanism is in its locked position and said engine drives the auxiliary apparatus when said safety mechanism is in its unlocked position, and said converting step further comprises actuating said safety mechanism to said locked position and said actuating step further comprises actuating said safety mechanism to said unlocked position.

* * * * *